US012678834B2

(12) United States Patent
Pruiett et al.

(10) Patent No.: US 12,678,834 B2
(45) Date of Patent: Jul. 14, 2026

(54) ULTRASONIC CLEANING TOOL AND SYSTEM FOR CLEANING A SURFACE

(71) Applicant: BISSELL Inc., Grand Rapids, MI (US)

(72) Inventors: Jason W. Pruiett, Grand Rapids, MI (US); Jeffrey A. Scholten, Grand Rapids, MI (US); Danielle Boils, Saint Joseph, MI (US); JianJun Yu, Foshan City (CN); Jeremy Hoffman, Comstock Park, MI (US)

(73) Assignee: BISSELL Inc., Grand Rapids, MI (US)

( * ) Notice: Subject to any disclaimer, the term of this patent is extended or adjusted under 35 U.S.C. 154(b) by 746 days.

(21) Appl. No.: 18/161,946

(22) Filed: Jan. 31, 2023

(65) Prior Publication Data

US 2023/0166303 A1 Jun. 1, 2023

Related U.S. Application Data

(63) Continuation of application No. 16/516,322, filed on Jul. 19, 2019, now Pat. No. 11,590,541.

(60) Provisional application No. 62/700,620, filed on Jul. 19, 2018.

(51) Int. Cl.

| | |
|---|---|
| ***B08B 3/12*** | (2006.01) |
| ***A47L 7/00*** | (2006.01) |
| ***A47L 11/28*** | (2006.01) |
| ***A47L 13/17*** | (2006.01) |
| ***A47L 13/26*** | (2006.01) |
| ***B08B 7/02*** | (2006.01) |
| *A47L 13/22* | (2006.01) |

(52) U.S. Cl.

CPC ................ *B08B 3/12* (2013.01); *A47L 13/17* (2013.01); *A47L 7/0009* (2013.01); *A47L 11/28* (2013.01); *A47L 13/22* (2013.01); *A47L 13/26* (2013.01); *B08B 7/028* (2013.01)

(58) Field of Classification Search

CPC .......... A47L 7/00; A47L 7/0009; A47L 11/00; A47L 11/125; A47L 11/28; A47L 11/201; A47L 11/29; A47L 11/294; A47L 11/30; A47L 11/34; A47L 11/405; A47L 11/408; A47L 11/4088; A47L 11/4097; B08B 3/12; B08B 7/028

USPC .............................................................. 601/2

See application file for complete search history.

(56) References Cited

U.S. PATENT DOCUMENTS

| | | | | |
|---|---|---|---|---|
| 4,103,519 A * | 8/1978 | Davidson | ............ | A47L 11/4027 134/1 |
| 7,004,182 B2 * | 2/2006 | Duval | ...................... | B08B 3/12 15/97.1 |
| 2005/0080396 A1 * | 4/2005 | Rontal | ............ | A61B 17/22004 604/500 |
| 2005/0236012 A1 * | 10/2005 | Josefsson | ............ | A47L 11/4083 134/1 |

* cited by examiner

*Primary Examiner* — Brian D Keller
*Assistant Examiner* — Aaron R Mcconnell
(74) *Attorney, Agent, or Firm* — Quinn IP Law

(57) ABSTRACT

An ultrasonic cleaning tool for cleaning a surface has a transducer and a horn for generating and transmitting vibrations to a surface to be cleaned. Cleaning solution can be supplied to the ultrasonic cleaning tool or the surface to be cleaned, and operation of the ultrasonic cleaning tool can agitate the surface and cleaning solution. The tool can be provided as part of a system for cleaning a surface, and the system can include an extraction cleaner or a cleaning cloth.

19 Claims, 15 Drawing Sheets

ULTRASONIC CLEANING TOOL AND SYSTEM FOR CLEANING A SURFACE

CROSS-REFERENCE TO RELATED APPLICATION(S)

This application is a continuation of U.S. application Ser. No. 16/516,322, filed Jul. 19, 2019, which claims the benefit of U.S. Provisional Patent Application No. 700,620, filed Jul. 19, 2018, the entire contents of which are herein incorporated by reference in their entirety.

BACKGROUND

Surface cleaning tools can be adapted for cleaning a variety of surfaces, such as for stand-alone cleaning or for coupling with a surface cleaning apparatus. Some examples of surface cleaning apparatuses include a portable or hand-carriable unit, an upright-type unit, a canister-type unit, or a stick-type unit. One exemplary surface cleaning apparatus can be adapted to be hand-carried by a user to a cleaning area. Such a surface cleaning apparatus can be provided with hoses and hand tools adapted for cleaning a variety of surfaces.

DETAILED DESCRIPTION

The disclosure relates to an ultrasonic tool for cleaning a surface. It is noted that the tool may have a variety of applications, including general use as an accessory tool for a surface cleaning apparatus that is operable to apply liquid and extract liquid from any surface to be cleaned. The ultrasonic tool can generate ultrasonic vibrations that can break down dirt or debris into smaller particles, and such ultrasonic vibrations when applied to a cleaning fluid can improve the efficacy of the cleaning fluid during use.

Figure 1:
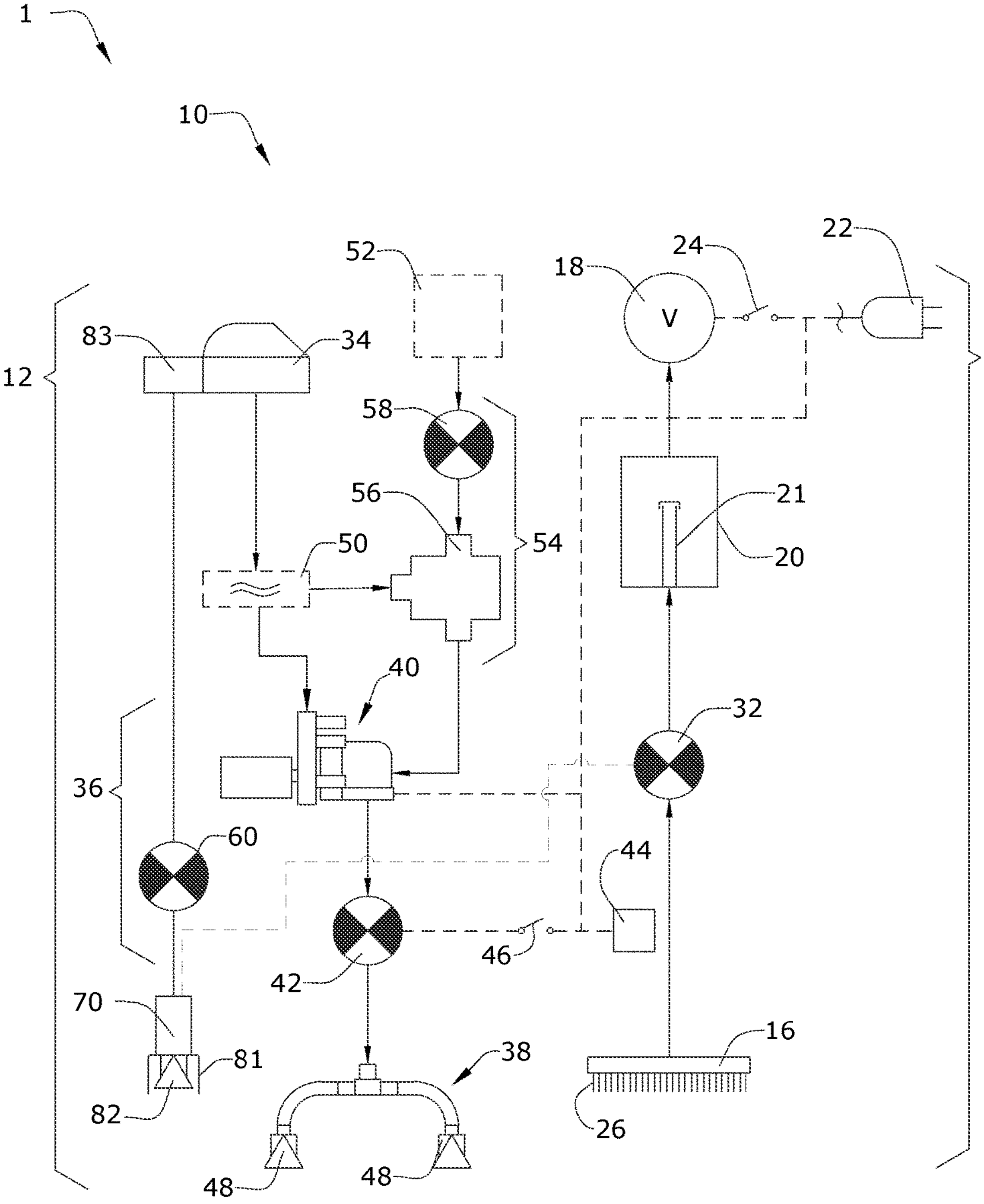
FIG. 1 is a schematic view of an exemplary system for cleaning a surface including an ultrasonic cleaning tool according to various aspects described herein.

FIG. 1 is a schematic view of various functional components of a system 1 for cleaning a surface. The system 1 includes a surface cleaning apparatus in the form of an exemplary extraction cleaner 10, as well as an ultrasonic surface cleaning tool 70, also referred to herein as an "ultrasonic cleaning tool 70" or simply "ultrasonic tool 70". The functional systems of the exemplary extraction cleaner 10 can be arranged into any desired configuration, such as an upright extraction device having a base and an upright body for directing the base across the surface to be cleaned, a canister device having a cleaning implement connected to a wheeled base by a vacuum hose, a portable extractor adapted to be hand carried by a user for cleaning relatively small areas, or a commercial extractor. Any of the aforementioned extraction cleaners can be adapted to include a flexible vacuum hose, which can form a portion of the working air conduit between a nozzle and the suction source.

The extraction cleaner 10 can include a fluid delivery system 12 for storing cleaning fluid and delivering the cleaning fluid to the surface to be cleaned and a recovery system 14 for removing the spent cleaning fluid and debris from the surface to be cleaned and storing the spent cleaning fluid and debris.

The recovery system 14 can include a suction nozzle 16, a suction source 18 in fluid communication with the suction nozzle 16 for generating a working air stream, and a recovery container 20 for separating and collecting fluid and debris from the working airstream for later disposal. A separator 21 can be formed in a portion of the recovery container 20 for separating fluid and entrained debris from the working airstream.

The suction source 18 can be any suitable suction source, such as a motor/fan assembly which is provided in fluid communication with the recovery container 20. The suction source 18 can be electrically coupled to a power source 22, such as a battery or by a power cord plugged into a household electrical outlet. A suction power switch 24 between the suction source 18 and the power source 22 can be selectively closed by the user, thereby activating the suction source 18.

The suction nozzle 16 can be provided on a base or cleaning head adapted to move over the surface to be cleaned. An agitator 26 can be provided adjacent to the suction nozzle 16 for agitating the surface to be cleaned so that the debris is more easily ingested into the suction nozzle 16. Some examples of agitators 26 include, but are not limited to, a horizontally-rotating brushroll, dual horizontally-rotating brushrolls, one or more vertically-rotating brushrolls, or a stationary brush.

The ultrasonic tool 70 can be coupled to the fluid delivery system 12 and recovery system 14. The ultrasonic tool 70 can be provided for transmitting ultrasonic vibrations to the surface to be cleaned to transfer energy to the surface and optionally to cleaning liquid supplied to the surface being cleaned. The ultrasonic tool 70 can include an ultrasonic energy source such as a transducer 75 for generating vibrations and a horn 76 (FIG. 2) for transmitting vibrations to a surface to be cleaned. The power source 22 can provide power for the ultrasonic tool 70, such as via a battery pack or wall outlet in non-limiting examples, and can provide alternating current (AC) or direct current (DC) power as desired. The ultrasonic tool 70 can also include a tool suction nozzle 81, wherein an optional diverter assembly 32 can selectively couple the ultrasonic cleaning tool 70 or the suction nozzle 16 to the suction source 18. In some examples the cleaning tool 70 can include a hose or other extended-length conduit for reaching a surface to be cleaned. The ultrasonic tool 70 can also include at least one tool distributor outlet 82 configured to dispense a cleaning fluid.

The fluid delivery system 12 can include at least one fluid container 34 for storing a supply of fluid. The fluid can include one or more of any suitable cleaning fluids, including, but not limited to, water, compositions, concentrated detergent, diluted detergent, etc., and mixtures thereof. For example, the fluid can include a mixture of water and concentrated detergent.

The fluid delivery system 12 can further comprise a flow control system 36 for controlling the flow of fluid from the container 34 to at least one fluid distributor, such as a primary fluid distributor 38 of the extraction cleaner 10, and optionally to the tool distributor outlet 82 of the tool 70 as described in further detail below. In one configuration, the flow control system 36 can include at least one pump 40 which pressurizes the system 12 and a flow control valve 42 which controls the delivery of fluid to the distributor 38. In one example, the pump 40 can be coupled with the power source 22. An actuator 44 can be provided to actuate the flow control system 36 and dispense fluid to the distributor 38. The actuator 44 can be operably coupled to the valve 42 such that pressing the actuator 44 will open the valve 42. The valve 42 can be electrically actuated, such as by providing an electrical switch 46 between the valve 42 and the power source 22 that is selectively closed when the actuator 44 is pressed, thereby powering the valve 42 to move to an open position. In one example, the valve 42 can be a solenoid valve.

The fluid distributor 38 can include at least one distributor outlet 48 for delivering fluid to the surface to be cleaned. The at least one distributor outlet 48 can be positioned to deliver fluid directly to the surface to be cleaned, or indirectly by delivering fluid onto the agitator 26. The at least one distributor outlet 48 can comprise any structure, such as a nozzle or spray tip; multiple outlets 48 can also be provided.

Optionally, a heater 50 can be provided for heating the cleaning fluid prior to delivering the cleaning fluid to the surface to be cleaned. In the example illustrated in FIG. 1, an in-line heater 50 can be located downstream of the container 34 and upstream of the pump 40. Other types of heaters 50 can also be used. In yet another example, the cleaning fluid can be heated using exhaust air from a motor-cooling pathway for the suction source 18.

As another option, the fluid delivery system 12 can be provided with at least one additional container for storing a cleaning fluid. For example, the container 34 can store water and an additional container 52 can store a cleaning agent such as detergent. The containers 34, 52 can, for example, be defined by a supply tank and/or a collapsible bladder. In one configuration, the container 34 can be a bladder that is provided within the recovery container 20. Alternatively, a single container 34 can define multiple chambers for different fluids.

In the case where multiple containers 34, 52 are provided, the flow control system 36 can further be provided with a mixing system 54 for controlling the composition of the cleaning fluid that is delivered to the surface. The composition of the cleaning fluid can be determined by the ratio of cleaning fluids mixed together by the mixing system. As shown herein, the mixing system 54 includes a mixing manifold 56 that selectively receives fluid from one or both of the containers 34, 52. A mixing valve 58 is fluidly coupled with an outlet of the additional container 52, whereby when mixing valve 58 is open, the second cleaning fluid will flow to the mixing manifold 56. By controlling the orifice of the mixing valve 58 or the time that the mixing valve 58 is open, the composition of the cleaning fluid that is delivered to the surface can be selected.

The fluid delivery system 12 can optionally include a tool supply container 83 such as a prefilled cartridge that can be configured to store an additional cleaning solution, such as a carbonated cleaning solution, for the ultrasonic tool 70. The tool supply container 83 can be fluidly coupled via a control valve 60 to the tool distributor outlet 82. Actuation of the control valve 60 delivers cleaning solution, such as a carbonated cleaning solution, to the tool distributor outlet 82. The control valve 60 can be provided as a spray trigger on the tool supply container 83 or elsewhere on the tool 70, and cleaning solution can be carbonated when the spray trigger is actuated.

The tool supply container 83 can be provided on the tool 70 itself, or can be provided elsewhere the extraction cleaner 10 and fluidly coupled with the tool 70. In one example of the latter, the tool supply container 83 can be mounted on the extraction cleaner 10, such as on the supply container 34, and fluidly coupled to the supply container 34 such that cleaning solution distributed from the tool supply container 83 flows into the supply container 34 and distributor outlets 48. In another example, the tool supply container 83 can be mounted on or adjacent the supply container 34 and a dedicated fluid delivery path can fluidly couple the tool supply container 83 to the distributor outlets 48 or to the tool distributor outlet 82.

Optionally, the pump 40 can be eliminated and the flow control system 36 can include a gravity-feed system having a valve fluidly coupled with an outlet of the container(s) 34, 52, whereby when valve is open, fluid will flow under the force of gravity to the distributor 38. The valve can be mechanically actuated or electrically actuated, as described above.

The system 1 and extraction cleaner 10 shown in FIG. 1 can be used to effectively remove debris and fluid from the surface to be cleaned in accordance with the following method. The sequence of steps discussed is for illustrative purposes only and is not meant to limit the method in any way as it is understood that the steps may proceed in a different logical order, additional or intervening steps may be included, or described steps may be divided into multiple steps.

In operation, the extraction cleaner 10 is prepared for use by coupling the extraction cleaner 10 to the power source 22, and by filling the container 34, and optionally the additional container 52 or tool supply container 83, with cleaning fluid. Cleaning fluid is selectively delivered to the surface to be cleaned via the fluid delivery system 12 by user-activation of the actuator 44 or via the ultrasonic tool 70. During operation of the recovery system 14, the extraction cleaner 10 draws in fluid and debris-laden working air through the suction nozzle 16 or ultrasonic tool 70, depending on the position of the diverter assembly 32, and into the downstream recovery container 20 where the fluid debris is substantially separated from the working air. The airstream then passes through the suction source 18 prior to being exhausted from the extraction cleaner 10. The recovery container 20 can be periodically emptied of collected fluid and debris.

During operation of the ultrasonic tool 70, the ultrasonic tool 70 can be moved over a surface to be cleaned wherein the transducer 75 causes vibration of the horn 76 for agitation of the surface (such as carpet). Such agitation can cause dirt or debris to break into smaller pieces while being liberated from the surface to be cleaned, and such liberated dirt or debris can be directed through the tool suction nozzle 81 and to the recovery container 20 via the suction source 18. Additionally, the tool distributor outlet 82 can provide cleaning fluid to the surface to be cleaned. Vibrational energy from the horn 76 can cause cavitation, or the formation of bubbles, within the cleaning fluid. The bubbling action can provide additional agitation to remove dirt and debris from the surface, and the used cleaning fluid can also be removed via the tool suction nozzle 81 and collected in the recovery container 20.

Figure 2:
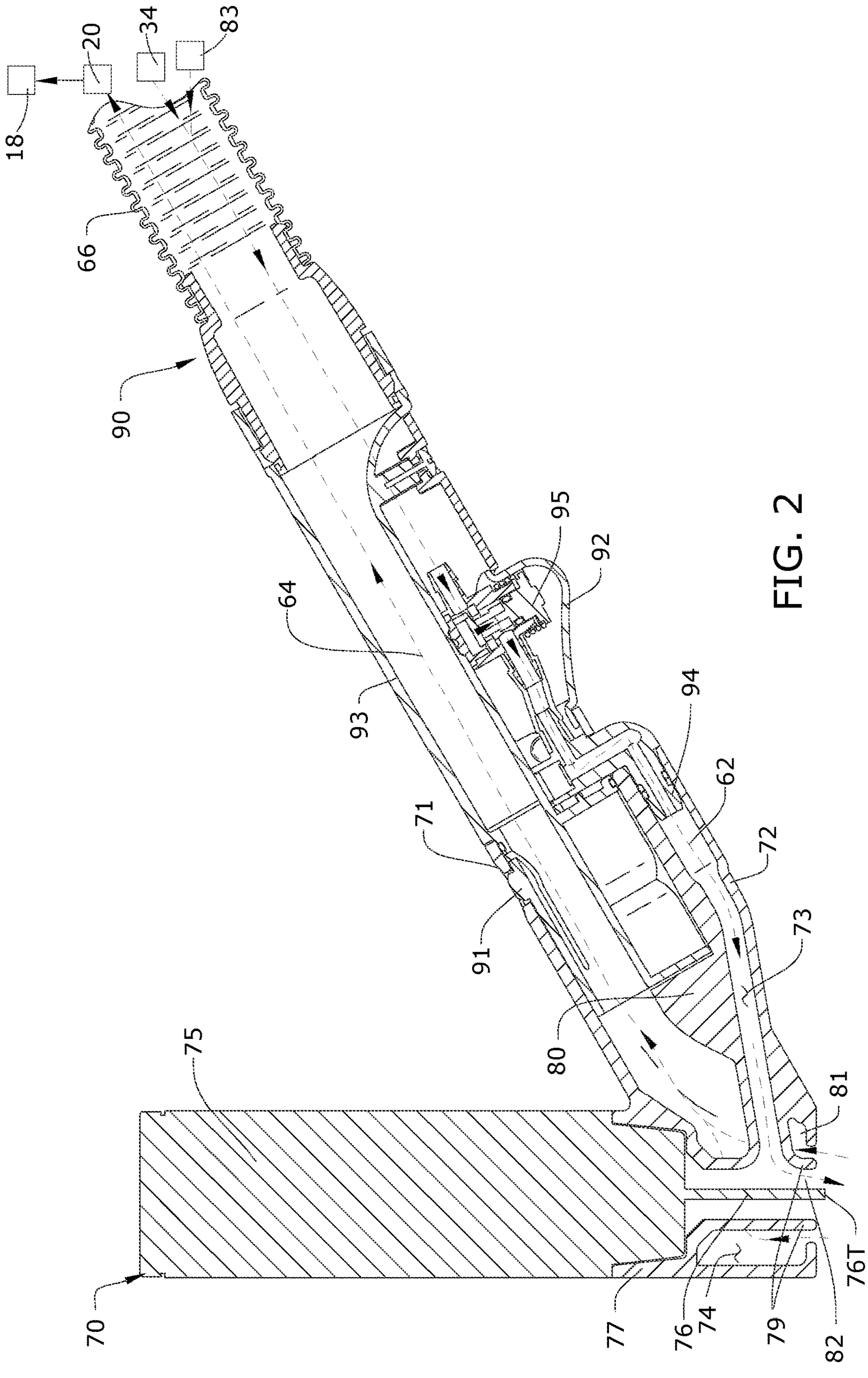
FIG. 2 is a sectional view of the ultrasonic cleaning tool of FIG. 1 coupled to a wand and hose according to various aspects described herein.

FIG. 2 illustrates a sectional view through the ultrasonic tool 70 from FIG. 1, where the ultrasonic tool 70 is coupled to a wand 90 and a conduit assembly, at least a portion of which may be in the form of a flexible hose 66. The hose 66 can include both a fluid delivery conduit within the suction conduit defining a portion of a fluid delivery pathway 62, as well as a suction conduit defining a portion of a recovery pathway 64. The ultrasonic tool 70 further includes a housing 72 with a delivery conduit 73 defining at least a portion of the fluid delivery pathway 62, as well as a recovery conduit 74 defining at least a portion of the recovery pathway 64. An annular conduit wall 79 can fluidly separate the delivery conduit 73 and the recovery conduit 74 proximate the horn 76. In addition, an internal divider 80 can also fluidly separate the delivery conduit 73 and the recovery conduit 74 within the housing 72.

The wand 90 can be coupled with the ultrasonic tool 70 via a depressible detent 91 on the wand 90 for receipt within an aperture 71 on the ultrasonic tool 70. This allows the ultrasonic tool 70 to be compatible with a variety of extraction cleaners or other surface cleaning apparatuses such as upright, portable or handheld extraction cleaners, for example, that can include a similar wand structure with a detent that can be inserted into the ultrasonic tool 70.

The wand 90 further includes a wand housing 93, illustrated herein as having the shape of a tube or conduit, a portion of which defines at least a portion of the recovery pathway 64 between the ultrasonic tool 70 and the extraction cleaner 10. The flexible hose 66 couples with an end of the wand housing 93 opposite the tool 70.

In addition, the wand 90 can also include a fluid delivery nozzle 94 configured to fluidly couple to the delivery conduit 73, and further defining at least a portion of the fluid delivery pathway 62. A wand trigger 92 protrudes from the lower surface of the wand 90 and is configured to selectively provide cleaning fluid to the fluid delivery nozzle 94. The wand 90 can be provided with a trigger valve 95, such as a check valve, that is operably coupled with the wand trigger 92 such that actuation of the trigger 92 can open the trigger valve 95 to selectively provide cleaning fluid through the nozzle 94.

The trigger valve 95 can be fluidly coupled with at least one source of cleaning fluid, such as the tool supply container 83 (FIG. 1), the primary supply container 34, or both, to supply cleaning fluid to the nozzle 94. While not shown in FIG. 2, a fluid delivery conduit can couple the tool supply container 83 with an inlet to the trigger valve 95, and/or a fluid delivery conduit of the hose 66 can couple the primary supply container 34 with an inlet to the trigger valve 95.

The transducer 75 of the ultrasonic tool 70 is configured to generate ultrasonic vibrations, and the horn 76 is configured to amplify and direct such vibrations toward a tip 76T of the horn 76. While not shown, the transducer 75 can be coupled to, or integrated with, an ultrasonic generator or booster configured to drive or amplify vibration of the horn 76 at a predetermined frequency. One non-limiting example of a predetermined vibration frequency for the horn 76 can be in the ultrasonic range above 18 kHz and can include frequencies in the range of 30 to 60 kHz. It is further contemplated that the vibration frequency can be selected by a user, or that a predetermined time-varying pattern of vibration frequencies can be utilized.

The housing 72 of the ultrasonic tool 70 can include a seat 77 within which the transducer 75 can be positioned. While not shown, a snap-fit or other coupling mechanism can be utilized to secure the transducer 75 and horn 76 within the seat 77. It is contemplated that the transducer 75 and horn 76 can be removable from the housing 72 for spot cleaning of surfaces as desired.

The ultrasonic tool 70 can further include the tool distributor outlet 82 defining an outlet of, and in fluid communication with, the fluid delivery pathway 62. The tool distributor outlet 82 can be in fluid communication with either or both of the fluid container 34 and the tool supply container 83, as well as in fluid communication with the delivery conduit 73 of the housing 72. In addition, the tool distributor outlet 82 is located adjacent the horn 76. In this manner, cleaning fluid, such as carbonated cleaning fluid, can be distributed to a surface to be cleaned adjacent the horn 76 as shown.

The ultrasonic tool 70 further includes the tool suction nozzle 81 defining an inlet to, and in fluid communication with, the recovery pathway 64. The tool suction nozzle 81 can be adapted to be in fluid communication with the suction source 18 (FIG. 1). The tool suction nozzle 81 can be operably coupled to the suction source 18 via the wand 90 and hose 66. In addition, the tool suction nozzle 81 can be in fluid communication with the recovery conduit 74 of the housing 72.

Figure 3:
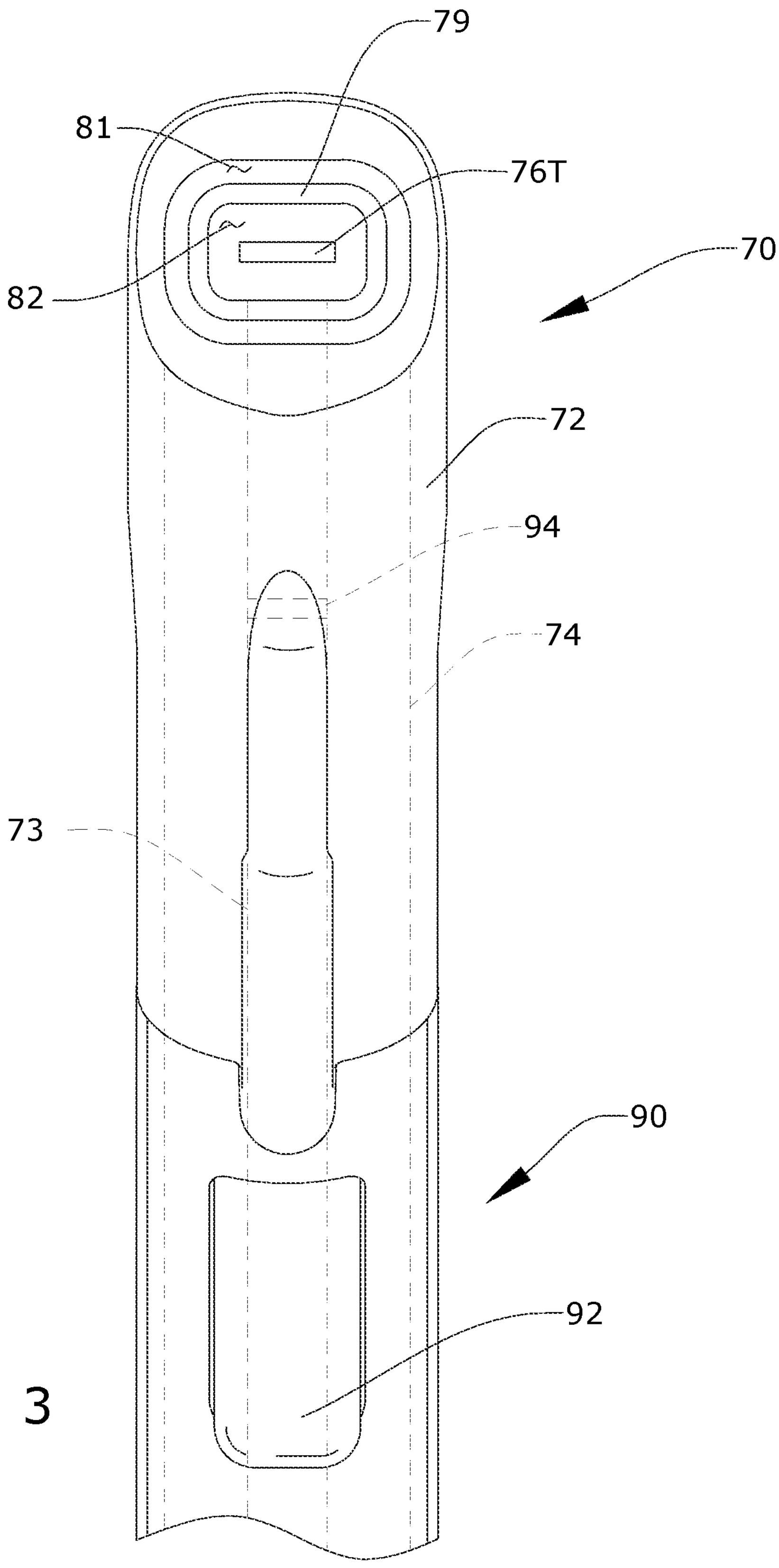
FIG. 3 is a bottom view of a portion of the ultrasonic cleaning tool of FIG. 1.

Turning to FIG. 3, a bottom view of the ultrasonic tool 70 illustrates that the tool suction nozzle 81 can be formed as an annular suction nozzle surrounding the tool distributor outlet 82 as shown. The annular conduit wall 79 can fluidly separate the tool suction nozzle 81 and the tool distributor outlet 82. The ultrasonic horn tip 76T can be positioned at the center of the tool distributor outlet 82 such that cleaning fluid dispensed from the outlet 82 can surround the tip 76T in operation.

Figure 4A:
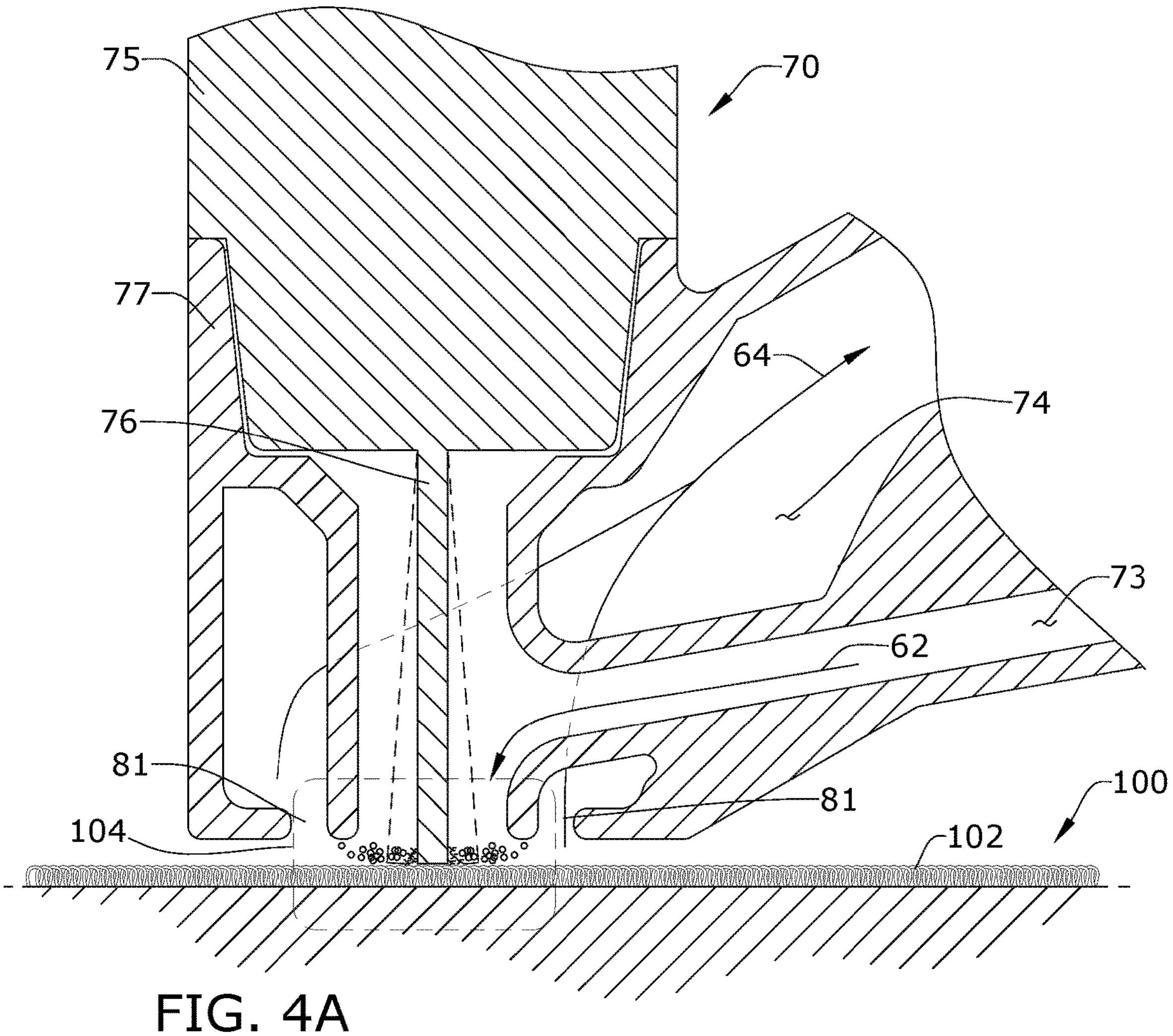
FIG. 4A is a sectional view of a portion of the ultrasonic cleaning tool of FIG. 2 during cleaning of a surface.

FIG. 4A illustrates the operation of the ultrasonic tool 70 during cleaning of a surface 100. In the example shown, the surface 100 is a carpeted surface having carpet fibers 102. The ultrasonic tool 70 is illustrated with the tip 76T of the ultrasonic horn 76 adjacent the carpet fibers 102 for agitation. It will be understood that the tip 76T can also be positioned within adjacent carpet fibers 102 such that the conduit wall 79 can abut the carpet fibers 102, with the tip 76T extending into the fibers 102.

Carbonated cleaning solution can be supplied through the delivery conduit 73 toward the horn tip 76T. Vibrations from the transducer 75 can cause the horn 76 to oscillate between first and second positions 76A, 76B schematically illustrated in dashed line. Such oscillations cause agitation of the carpet fibers 102 mixed with carbonated cleaning solution for cleaning. Operation of the suction source 18 (FIG. 1) can cause used cleaning solution, dirt, debris, hair, and the like to move through the tool suction nozzle 81 and through the recovery conduit 74 toward the extraction cleaner 10 (FIG. 3) for collection in the recovery container 20.

Figure 4B:
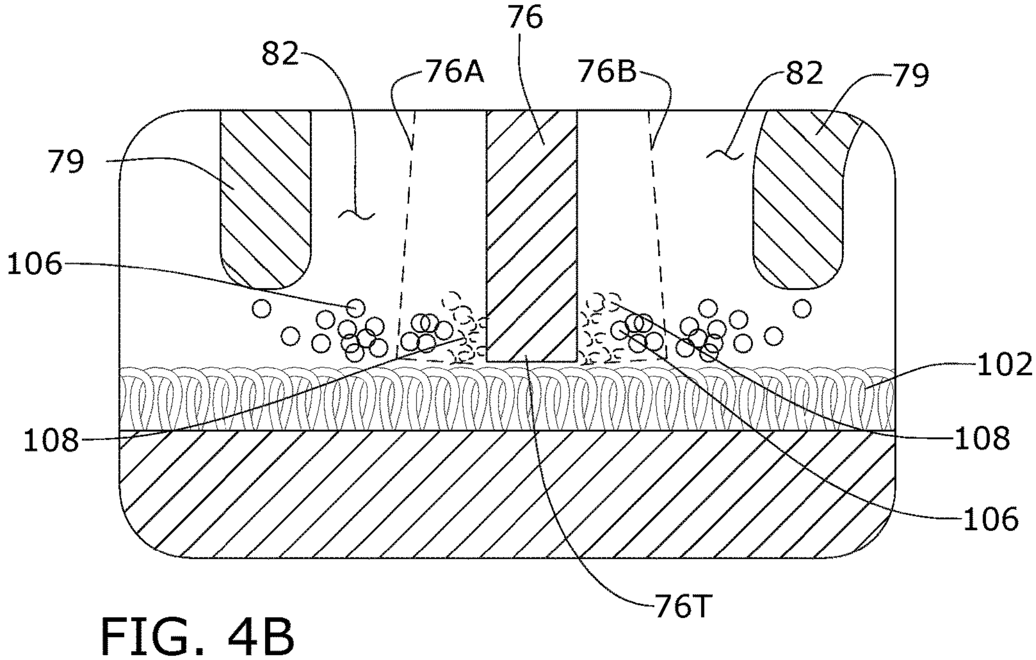
FIG. 4B is an enlarged view of a portion of the ultrasonic cleaning tool of FIG. 4A during cleaning of a surface.

A portion 104 of the ultrasonic tool 70 and surface 100 is illustrated in FIG. 4B. The energy delivered to the carbonated cleaning fluid from the vibrating horn 76 can induce the formation of vibrating bubbles 106 within the cleaning solution. A carbonated cleaning solution can form a greater number of bubbles 106 compared to an uncarbonated, or "still," cleaning solution, as the ultrasonic energy also causes carbon dioxide gas to come out of solution to form additional bubbles 106. However, it should be understood that bubbles 106 can be generated in any liquid under ultrasonic vibration such as that provided by the horn 76.

The bubbles 106 are unstable under ultrasonic vibration, and after a short time duration (e.g. 1-2 μs) the bubbles 106 collapse, implode, or "pop," forming a localized pressure wave 108. The pressure waves 108 from each imploding bubble 106 can further break up dirt, debris, or other contaminants within the carpet fibers, drawing such contaminants into the cleaning solution or working air stream for removal via the recovery pathway 64. It is contemplated that use of such a carbonated cleaning agent and ultrasonic tool can produce millions of bubbles 106 per second that generate corresponding pressure waves 108 for cleaning the surface 100.

Figure 5:
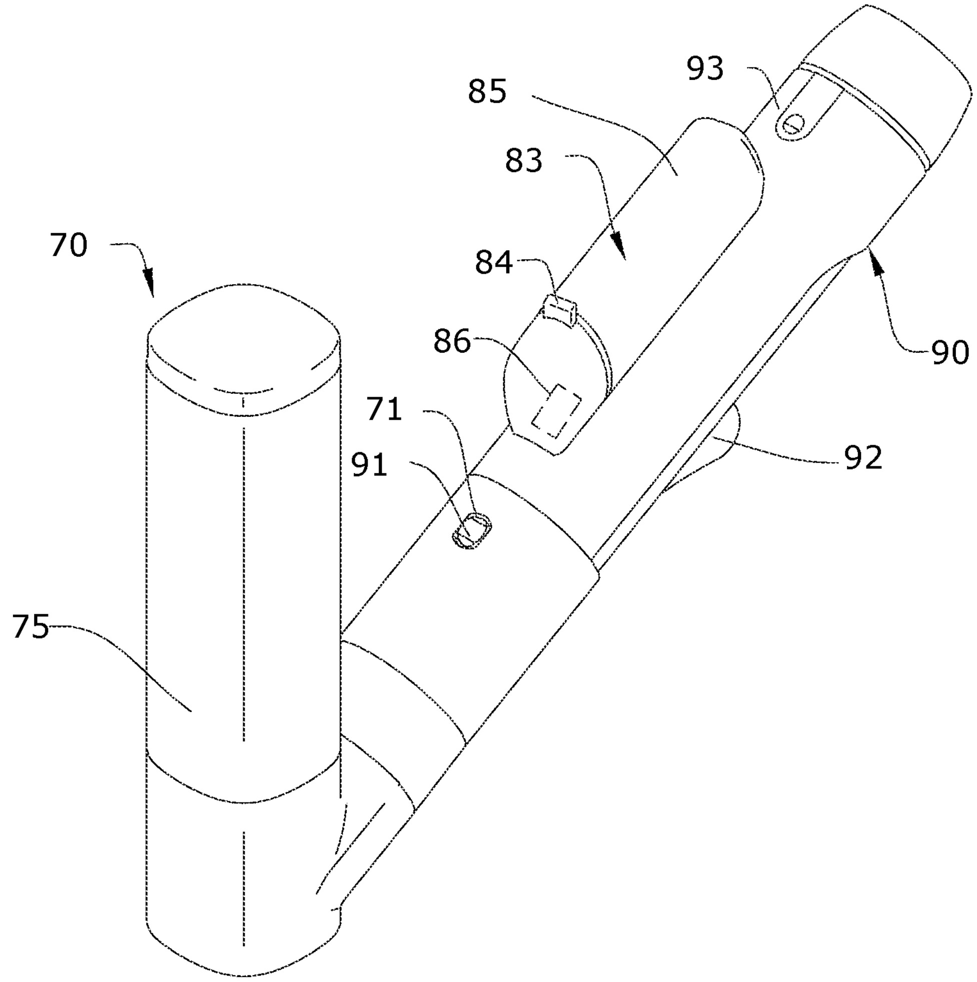
FIG. 5 is a perspective view of the ultrasonic cleaning tool of FIG. 1 illustrating a tool supply container.

FIG. 5 is a view similar to FIG. 2 showing an alternative example of the tool 70, where the tool supply container 83, shown as a carbonation device, is provided on the tool 70. In the illustrated example, the tool supply container 83 can be carried on the housing 72 of the ultrasonic tool 70. In such a case, the tool supply container 83 can include a dispensing mechanism such as a trigger or push button 84 for selective or on-demand dispensing of supply of carbonated cleaning solution from a reservoir 85 within the tool supply container 83. In addition, the tool supply container 83 can include a container outlet 86 fluidly coupled to the delivery conduit 73 and the fluid delivery pathway 62 (FIG. 2). It is further contemplated that multiple cartridges can be provided and fluidly coupled to the ultrasonic tool 70 as desired.

In the illustrated example the tool supply container 83 and push button 84 are provided in addition to the container 34 and trigger 92, although it is understood that the tool 70 may use only the tool supply container 83 as a fluid source, and the trigger 92, nozzle 94, valve 95, and associated fluid connections may be eliminated. However, providing both fluid sources and dispensing mechanisms may be advantageous in providing a tool 70 that can dispense both non-carbonated and carbonated cleaning solution. As shown herein, the outlet of the tool supply container 83 can be coupled with the fluid delivery pathway 62 downstream of the nozzle 94.

Figure 6:
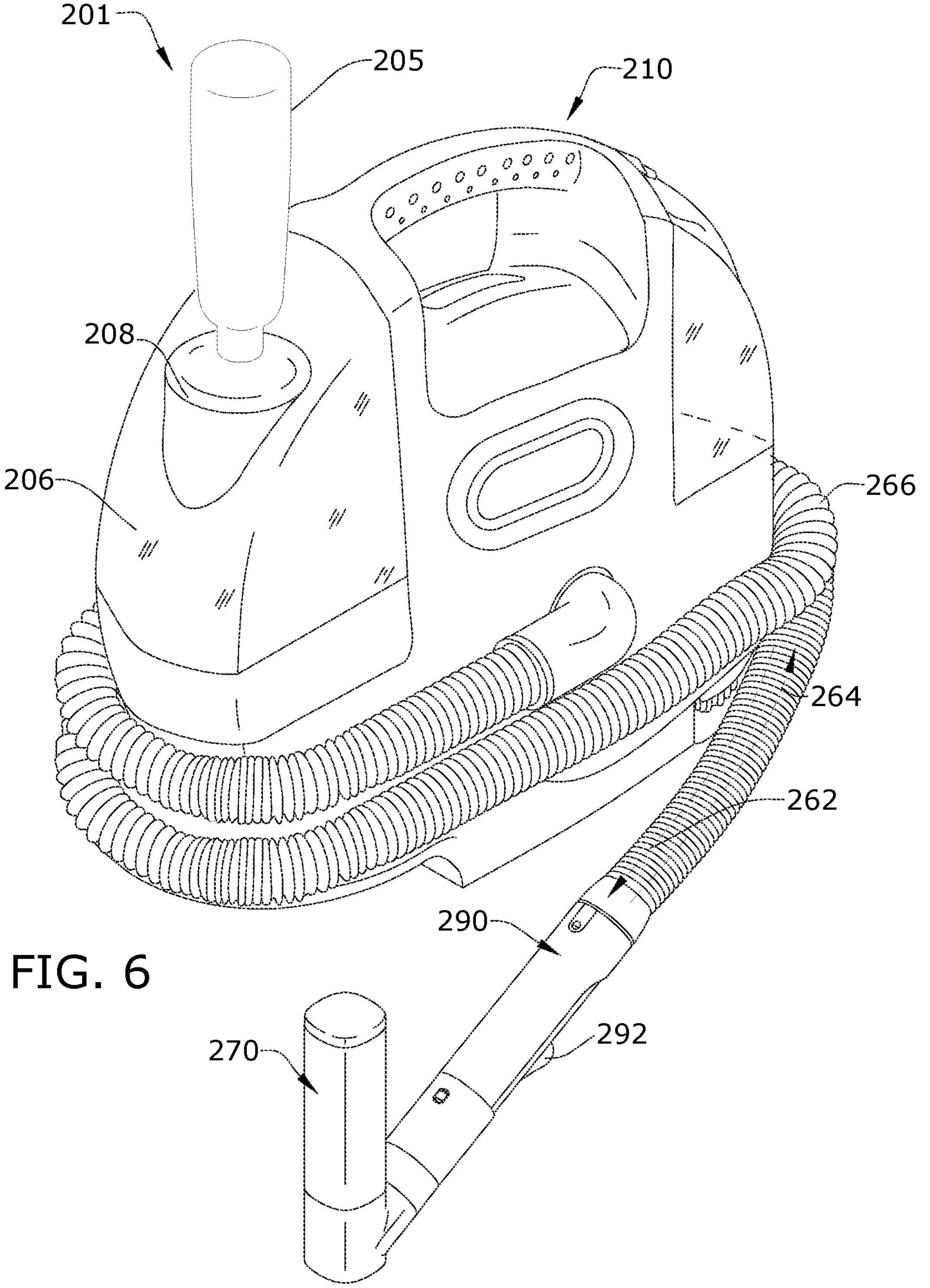
FIG. 6 is a perspective view of another system for cleaning a surface including an ultrasonic cleaning tool according to various aspects described herein.

FIG. 6 shows, in a perspective view, another system 201 for cleaning a surface. The system 201 is similar to the system 1; therefore, like parts will be identified with like numerals increased by 200, with it being understood that the description of the like parts of the system 1 applies to the system 201, except where noted.

The system 201 includes a surface cleaning apparatus in the form of a portable extraction cleaner 210. An ultrasonic tool 270 is coupled with the portable extraction cleaner 210 via a wand 290 and hose 266, all of which may include any or all of the features described above with respect to FIGS. 1-5. For example, a fluid delivery pathway 262 and a fluid recovery pathway 264 can extend through the wand 290 and ultrasonic tool 270 as described above.

The system 201 is configured to distribute cleaning fluid to a surface which can include water or a mixture of water and another cleaning agent. Some non-limiting examples of cleaning fluids include detergent, soap, conditioner, and/or activated hydrogen peroxide. The system 201 is also configured to agitate and/or massage the cleaning fluid onto the surface or into carpet fibers, as well as extract used cleaning fluid and debris (which may include dirt, dust, soil, hair, and other debris) from the surface.

It will be understood that the portable extraction cleaner 210 can include any or all of the various systems and components described in FIG. 1, including at least a fluid delivery system for storing and delivering a cleaning fluid to the surface to be cleaned and a recovery system for extracting and storing the dispensed cleaning fluid, dirt and debris from the surface to be cleaned. Examples of a suitable portable extraction cleaner 210 are set forth in detail in U.S. Pat. No. 7,073,226, filed Nov. 27, 2002, and titled "Portable Extraction Cleaner," U.S. Pat. No. 7,228,589, filed Mar. 31, 2004, and titled "Unattended Spot Cleaning Apparatus," and U.S. Patent Publication No. 2015/0108244, filed Oct. 15, 2014, and titled "Apparatus for Cleaning a Surface," all of which are incorporated herein by reference in their entirety.

One difference compared to the system 1 is that the system 201 includes a cartridge 205, which can be a CO2 carbonation device, that is fluidly coupled to a fluid supply container 206 via a seat 208. Though not shown, the cartridge 205 can be sealingly received in the seat 208 such as via a locking mechanism, gasket, or other coupling mechanism to provide for fluid coupling of the cartridge 205 and fluid container. In one example, the cartridge 205 can automatically dispense carbonated cleaning solution into the fluid supply container during use (such as upon user activation of the trigger 292 on the wand 290). In another example, the cartridge 205 can include an actuator (not shown), such as a push button or trigger, to selectively dispense carbonated cleaning solution into the fluid supply container. In still another example, the cartridge 205 can be in the form of a bottle sealed with a cap and containing a carbonated cleaning solution. In use, the cap can be removed and the bottle can be inverted and docked in the seat 208.

Figure 7:
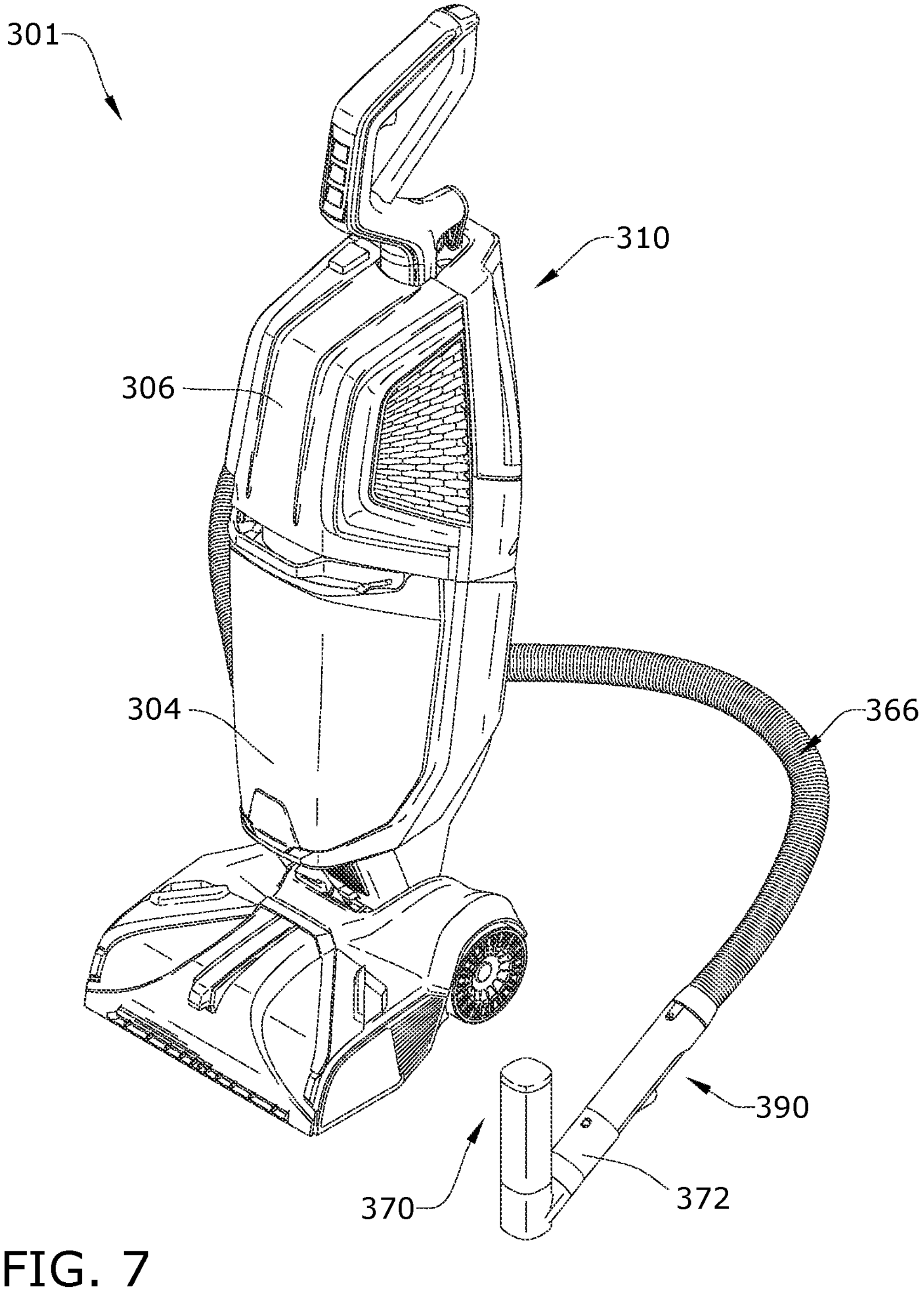
FIG. 7 is a perspective view of another system for cleaning a surface including an ultrasonic cleaning tool according to various aspects described herein.

FIG. 7 illustrates another example of a system 301 for cleaning a surface. The system 301 is similar to the systems 1, 201. Therefore, like parts will be identified with like numerals further increased by 100, with it being understood that the description of the like parts of the systems 1, 201 applies to the system 301, except where noted.

One difference is the system 301 includes an extraction cleaner in the form of an upright extraction cleaner 310. An ultrasonic tool 370 is coupled with the upright extraction cleaner 310 via a wand 390 and a hose 366, all of which may include any or all of the features described above with respect to FIGS. 1-6.

It will be understood that the upright extraction cleaner 310 can include any or all of the various systems and components described in FIG. 1, including at least a fluid delivery system for storing and delivering a cleaning fluid to the surface to be cleaned and a recovery system for extracting and storing the dispensed cleaning fluid, dirt and debris from the surface to be cleaned. Examples of a suitable upright extraction cleaner 310 for the system 301 are set forth in detail in U.S. Patent Publication No. 2018/0168419, filed Dec. 14, 2017, and titled "Surface Cleaning Apparatus," and U.S. Patent Publication No. 2017/0071434, filed Sep. 13, 2016, and titled "Surface Cleaning Apparatus," all of which are incorporated herein by reference in their entirety.

The ultrasonic tool 370 is coupled to the fluid delivery system and the recovery system of the upright extraction cleaner 310 via the hose 366 and wand 390. Cleaning fluid, including but not limited to a carbonated cleaning solution, can be stored in a fluid supply container 306 within the upright extraction cleaner 310 and supplied to a surface through the wand 390 to the ultrasonic tool 370. Used cleaning fluid, dirt, and debris can be directed through the wand 390 via the recovery system to a recovery container 304 within the upright extraction cleaner 310. In one alternate example, a cartridge or bottle supplying carbonated cleaning solution can be carried by, or inserted into, the fluid supply container for supply to the ultrasonic tool 370, as described above with respect to FIG. 6. In another alternate example, a cartridge or bottle supplying carbonated cleaning solution can be carried by or otherwise coupled to the housing 372 of the ultrasonic tool 370 as described above with respect to FIG. 5. Operation of the ultrasonic tool 370 can be performed similar to that described above wherein the ultrasonic tool 370 is placed over a surface to be cleaned, and the vibrating horn (FIG. 4) of the ultrasonic tool 370 can cause agitation of the surface and cause bubbling of the cleaning solution for cleaning the surface.

The use of tile as floor and wall coverings has become increasingly popular in recent years. A typical floor tile installation comprises a plurality of tiles bonded to an underlying subfloor by a bonding material, including mortar and grout. Typically, tiles are mounted to a subfloor and spaced apart such that a gap exists between adjacent tiles. The gap can ordinarily range from about ¼ inch to ¾ inch wide. These gaps are filled with grout, which results in a network of grout lines between the tiles. The grout lines can be recessed slightly below the tile surface in the form of grooves, which tend to collect soil and are difficult to clean because mop pads, including steam mop pads, tend to scrub along the top surface of the tile and miss the recessed grout lines.

Figure 8:
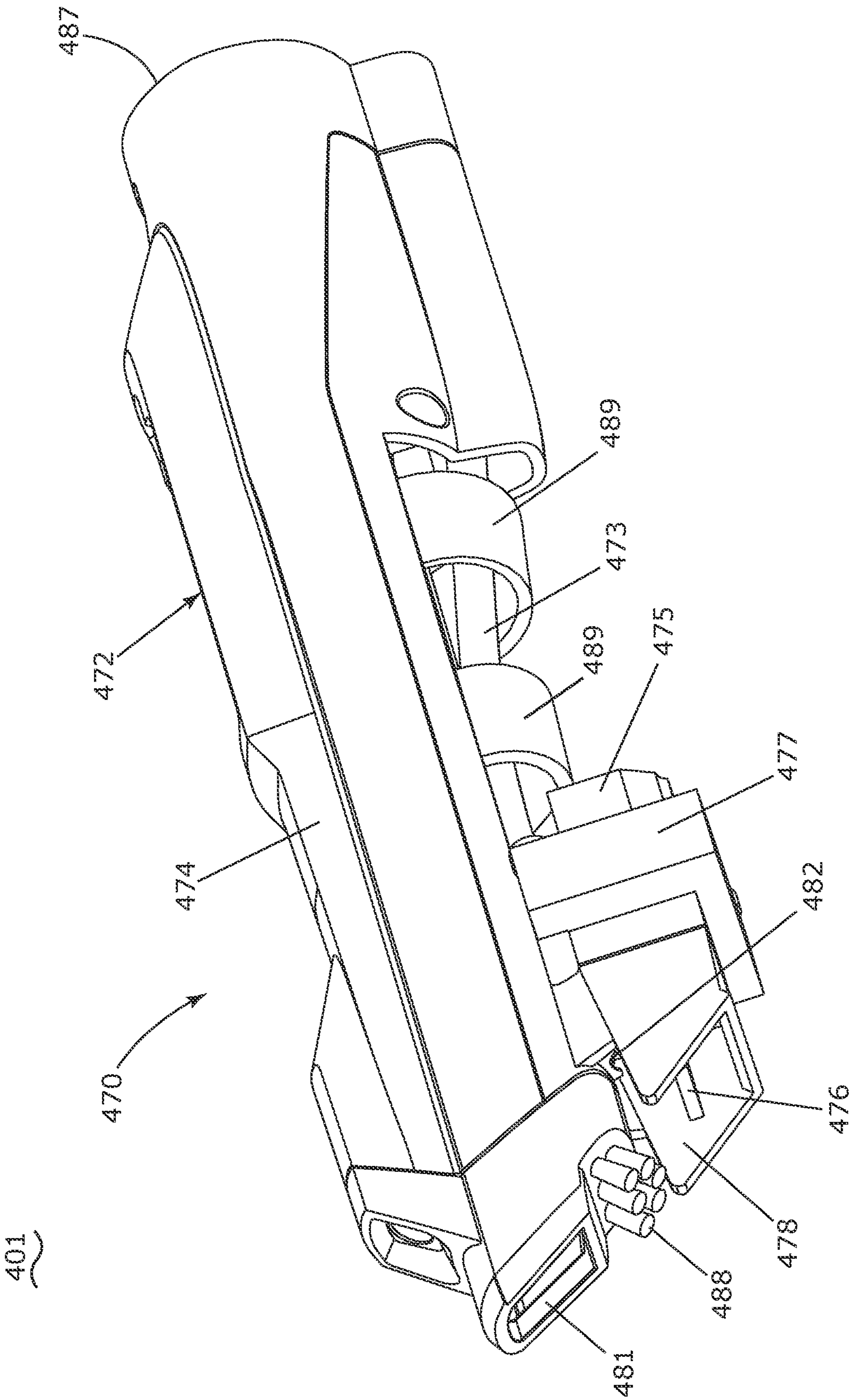
FIG. 8 is a perspective view of another system for cleaning a surface including an ultrasonic cleaning tool according to various aspects described herein.

FIG. 8 illustrates another example of a system 401 for cleaning a surface and which can be particularly useful in cleaning small areas including, by way of non-limiting example, cleaning tile grout joints, such as the joints formed between tiles on surfaces such as floors or walls. The system 401 is similar to the systems 1, 201, 301. Therefore, like parts will be identified with like numerals further increased by 100, with it being understood that the description of the like parts of the systems 1, 201, 301 applies to the system 401, except where noted.

The system 401 includes an ultrasonic tool 470 similar to the tools 70, 270, 370. The ultrasonic tool 470 can be coupled to a wand and conduit assembly (not shown) of a portable or upright extraction cleaner as described above.

The ultrasonic tool 470 can include a housing 472 with one end forming a connection point 487 for coupling to such a wand or conduit assembly. A transducer 475 configured to vibrate a horn 476 can be disposed within a seat 477 in the housing 472 as shown. One difference is that the seat 477 is disposed longitudinally along and parallel to the housing 472 as shown. The seat 477 can further include a guard 478 that at least partially surrounds the horn 476 to protect the horn 476 from undesired contact or collisions with objects during operation. Another difference is that a tool agitator 488 can be provided with the ultrasonic tool 470. The tool agitator 488 can be in the form of bristles, including bundles of fiber bristles or polymeric/rubber bristles, for agitating a surface to be cleaned during operation of the ultrasonic tool 470.

A tool suction nozzle 481 and tool distributor outlet 482 can be provided with the ultrasonic tool 470 as described above. The housing 472 of the ultrasonic tool 470 includes a delivery conduit 473 fluidly coupled to the tool distributor outlet 482 as well as a recovery conduit 474 fluidly coupled to the tool suction nozzle 481 as described above. Another difference is that the delivery conduit 473 is fluidly separated from the recovery conduit 474 along the length of the housing 472. More specifically, the delivery conduit 473 is in the form of a tube, such as a flexible tube, extending from the connection point 487 through a series of holding members 489 provided on the housing 472 separate from the recovery conduit 474.

Figure 9:
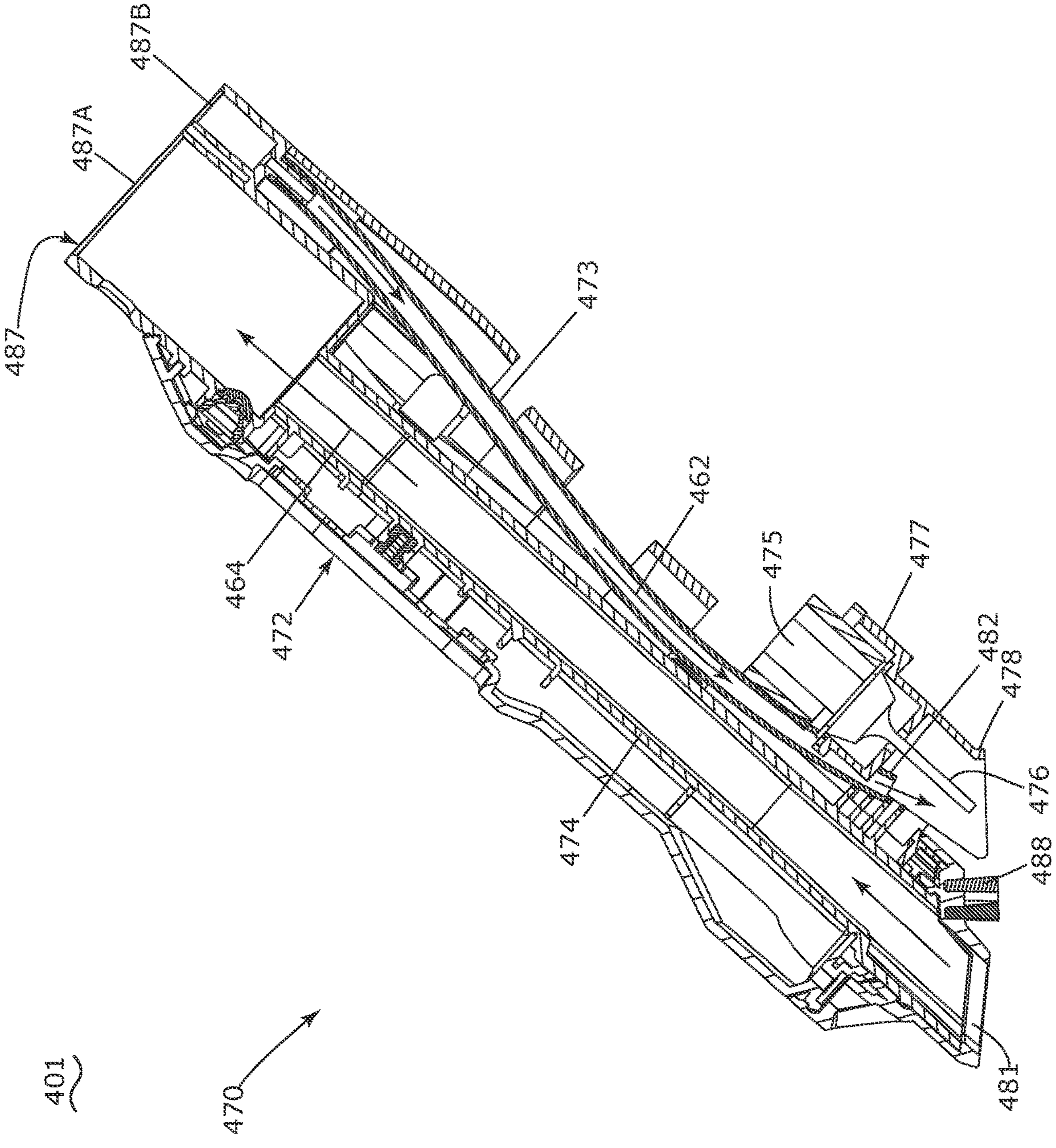
FIG. 9 is a sectional view of the ultrasonic cleaning tool of FIG. 8.

FIG. 9 illustrates a sectional view of the ultrasonic tool 470 during operation. The connection point 487 to a wand or conduit assembly (not shown) can further include a recovery connection 487A fluidly separated from a delivery connection 487B as shown. The recovery conduit 474 can form or define part of a fluid recovery pathway 462, and the delivery conduit 473 can form or define part of a fluid delivery pathway 464 as described above.

Cleaning fluid can be supplied through the delivery conduit 473, including a carbonated cleaning fluid as described above. In addition, cleaning fluid can be supplied either continuously or upon activation of a trigger, push button, or the like as described above. The tool distributor outlet 482 can deliver cleaning fluid directly onto the horn 476 during operation, where vibrations of the horn 476 can cause formation of bubbles, cavitation, or pressure waves as described above. The tool agitator 488 can provide for additional agitation of a surface to be cleaned along with the vibrations provided by the horn 476. Spent cleaning fluid, along with dirt, dust, or other debris, can be removed from the surface to be cleaned via the tool suction nozzle 481 and recovery conduit 474.

It will be understood that a specially formulated cleaning composition that includes a dilute hydrogen peroxide component in combination with an anionic detergent that includes an anionic surfactant such as sodium lauryl sulfate or other cleaning compositions including a bioactive enzyme, a protective chemistry, a carbonated fluid, or a combination, thereof, for example to further enhance grout cleaning effectiveness. The term "protective chemistry" as used herein can refer to a chemical composition that protects tile and grout from soiling and staining by resisting liquid penetration and can further protect the surface against mildew growth. One representative composition comprising water, methyl hydrogen polysiloxane, octamethylcyclotetrasiloxane, n-octyltriethoxysilane, and trimethylated silica is commercially available as 3M™ Scotchgard™ Tile & Grout Protector.

It will further be understood that a width of the ultrasonic tool 470 including that of the horn 476 and/or the tool agitator 488 can generally range from ¼ inch to ¾ inch depending on the width of the grout groove to be cleaned. It is contemplated that ultrasonic tool suction nozzle 481 of various widths can be interchangeably mounted to the housing 472.

Figure 10:
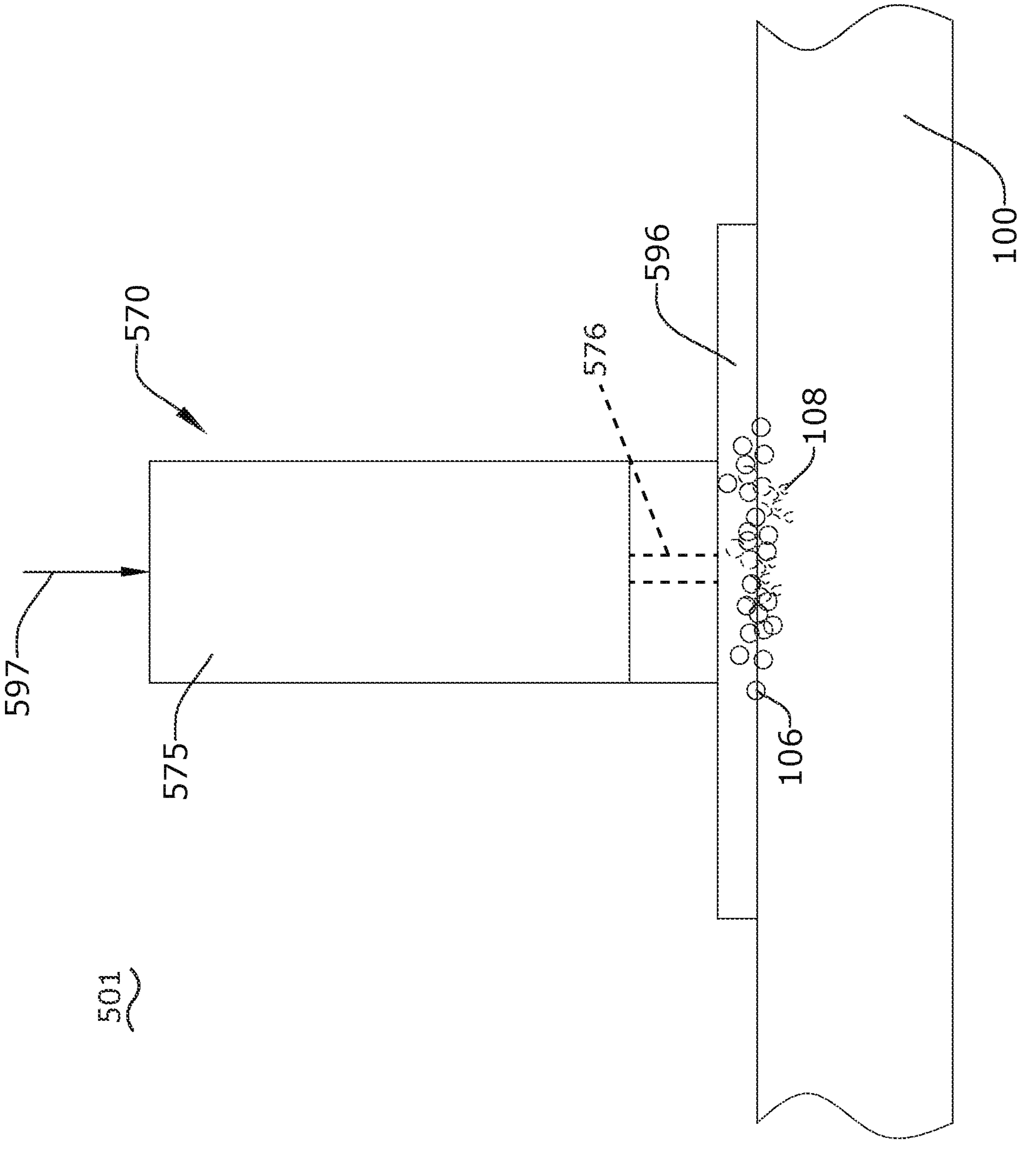
FIG. 10 is a schematic view of another system for cleaning a surface including an ultrasonic cleaning tool according to various aspects described herein.

Turning to FIG. 10, another system 501 for cleaning a surface is illustrated. The system 501 is similar to the systems 1, 201, 301, 401. Therefore, like parts will be identified with like numerals further increased by 100, with it being understood that the description of the like parts of the systems 1, 201, 301, 401 applies to the system 501, except where noted.

The system 501 includes an ultrasonic tool 570 similar to the ultrasonic tools 70, 270, 370, 470 described previously. One difference is that the ultrasonic tool 570 is a standalone ultrasonic tool that can operate without being fluidly coupled to an extraction cleaner. The ultrasonic tool 570 includes a transducer 575 as well as a horn 576. While not shown, the ultrasonic tool 570 can also include a power source such as a battery pack or a plug to connect to an electrical outlet.

The system 501 further includes a substrate in the form of a cleaning pad or cloth 596 pre-moistened with carbonated cleaning solution. The cleaning cloth 596 can include a variety of materials having suitable absorbency to hold cleaning solution including cotton, foam, sponge, and the like. In operation, the cleaning cloth 596 can be placed on a surface 100 to be cleaned as described above, or over a stain or other area to be treated on the surface 100, and the ultrasonic tool 570 can be positioned on the cleaning cloth 596 with the horn 576 in contact with the top side of the cleaning cloth 596. Downward pressure (illustrated with an arrow 597) applied to the ultrasonic tool 570 can drive carbonated cleaning solution from the cleaning cloth 596 to the surface 100. Ultrasonic vibrations from the horn 576 can also cause the formation of bubbles 106 within the cleaning solution; the resulting pressure waves 108 from the implosion of the bubbles 106 can break up dirt or debris in the surface 100 as described above.

Figure 11:
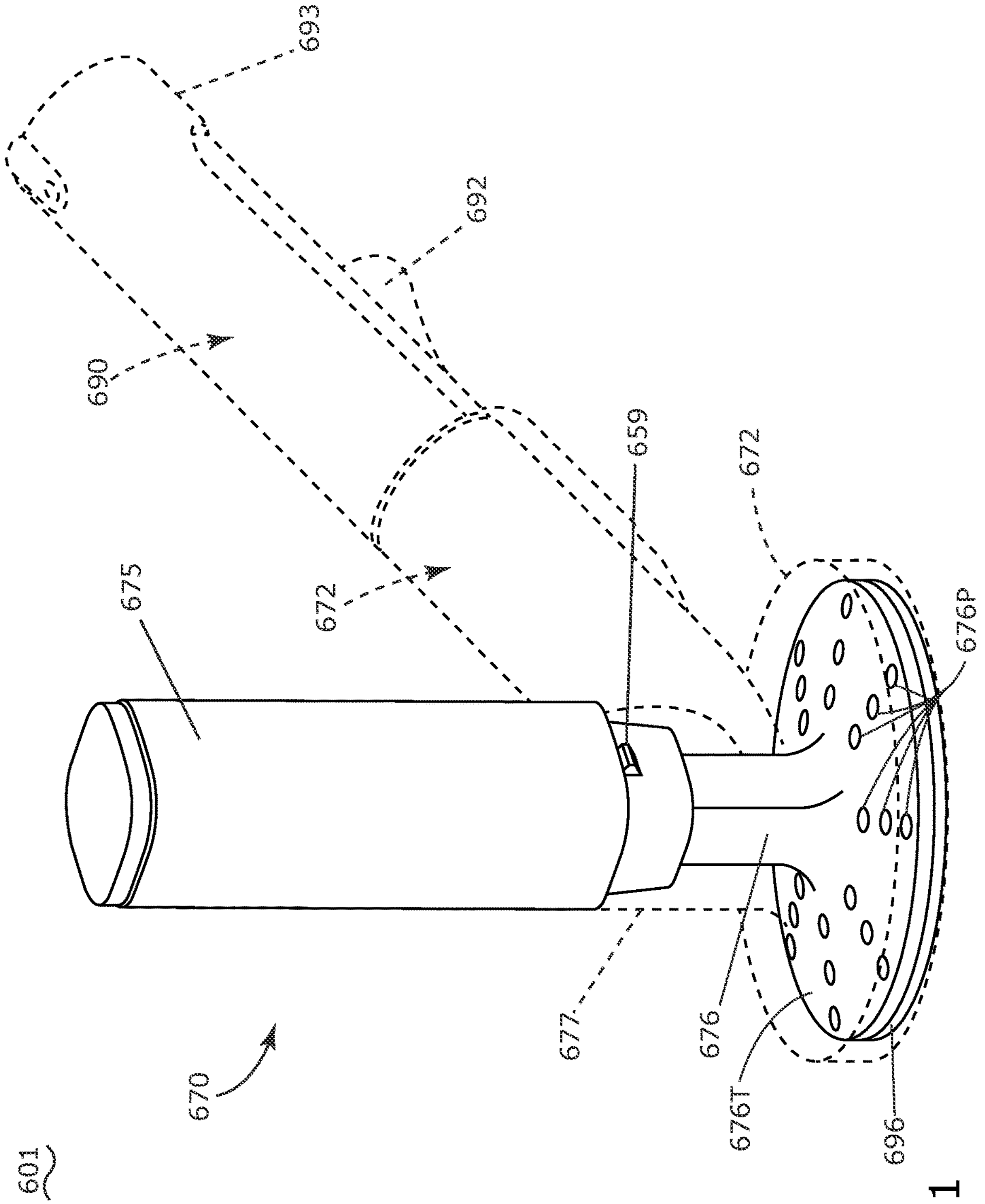
FIG. 11 is a perspective view of another system for cleaning a surface including an ultrasonic cleaning tool according to various aspects described herein.

Referring now to FIG. 11, another system 601 for cleaning a surface is illustrated. The system 601 is similar to the systems 1, 201, 301, 401, 501. Therefore, like parts will be identified with like numerals further increased by 100, with it being understood that the description of the like parts of the systems 1, 201, 301, 401, 501 applies to the system 601, except where noted.

The system 601 includes an ultrasonic tool 670 that can be coupled with an extraction cleaner (not shown) via a wand 690 or hose (not shown). The wand 690 can include a wand housing 693 and wand trigger 692 as described above.

Figure 12:
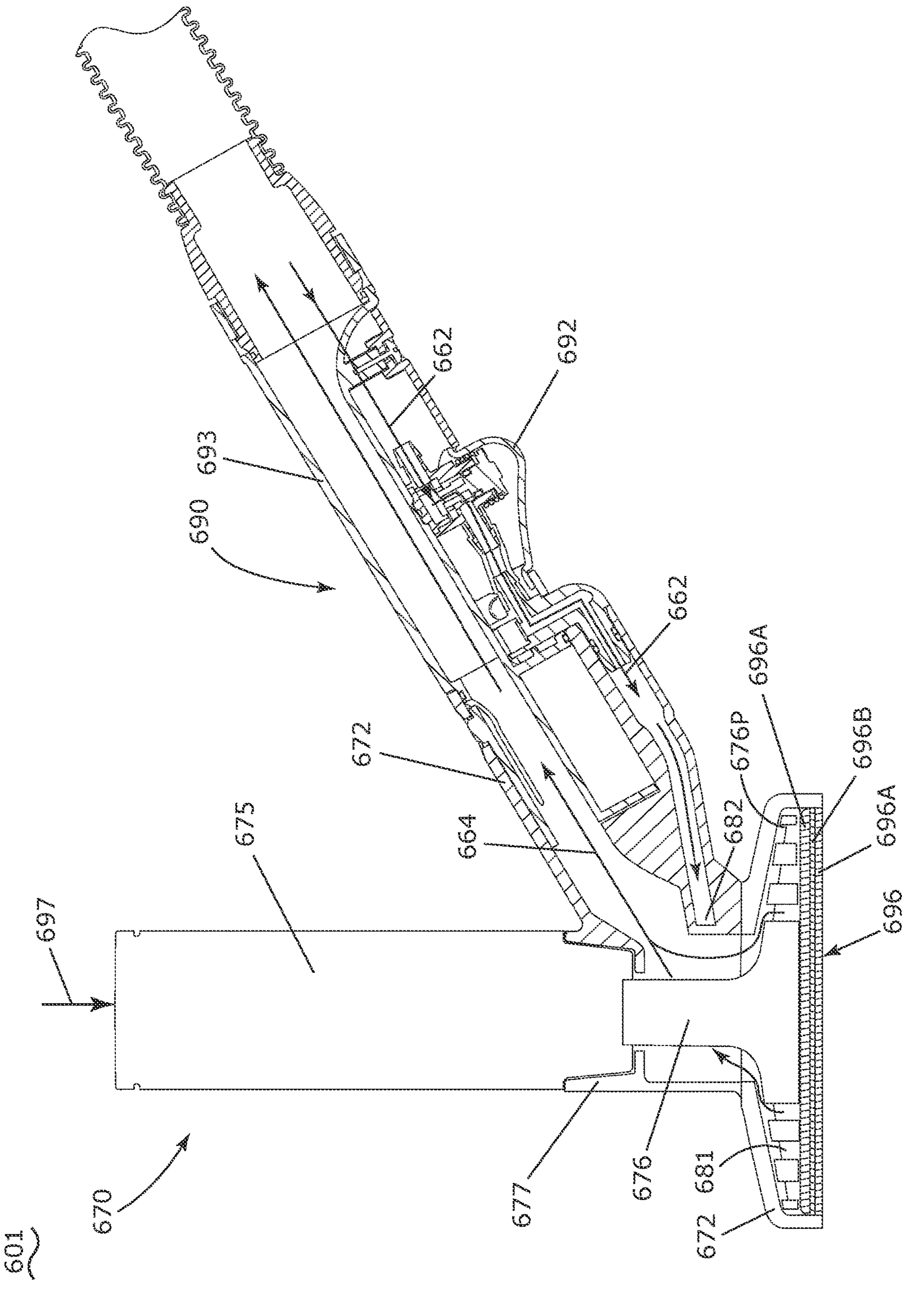
FIG. 12 is a sectional view of the ultrasonic cleaning tool of FIG. 11.

The ultrasonic tool 670 can include a housing 672, generally shown in phantom, with a tool suction nozzle 681 (FIG. 12) and tool distributor outlet 682 (FIG. 12). A seat 677 can be formed in the housing 672, the seat 677 can form a body or structure upon which a transducer 675 can be located. Optionally, a depressible detent or latch can be provided to secure the transducer 675 within the seat 677. A horn 676 is attached or operably coupled to the transducer 675 in any suitable manner.

One difference is that at least a portion of the horn 676 is in the shape of a flattened disk forming the horn tip 676T. Perforations 676P can extend through the horn tip 676T and form part of the flow path through the tool suction nozzle 681 (FIG. 12). The perforations 676P can have any suitable shape including round, square, rectangular, or the like, and can also have any suitable diameter such as 1 cm or smaller in a non-limiting example.

It is contemplated that ultrasonic tool 670 can be removable and separately used from the wand 690. A power source therein such as a battery pack (not shown) could be charged when the ultrasonic tool 670 is received within the wand 690. Clips or latches 659 can be utilized to selectively retain the ultrasonic tool 670 within the wand 690.

A cleaning pad 696 can be utilized with the ultrasonic tool 670. The cleaning pad 696 can be a disposable pad or a reusable pad in non-limiting examples.

FIG. 12 illustrates a sectional view of the ultrasonic tool 670 and the cleaning pad 696. By way of non-limiting example an outer layer 696A having perforations, including micro-perforations with apertures smaller than 1 mm can be included in the cleaning pad 696. In one example, the outer layer 696A can be formed of a non-absorbent, transparent material such as plastic or rubber. A pre-moistened inner layer 696B can be disposed within and surrounded by the outer layer 696A. For example, the inner layer 696B can be similar to the cleaning cloth 596 and can be saturated with cleaning fluid, including a carbonated or non-carbonated cleaning fluid. It is further contemplated that the cleaning pad 696 can be removable or disposable, such that a fresh cleaning pad 696 can be utilized each time cleaning of a surface is desired.

It will be understood that the cleaning pad 696 can be operably coupled to the ultrasonic tool 670 in any suitable manner or that the ultrasonic tool 670 can simply placed on the cleaning pad 696 during use.

During operation, the tool distributor outlet 682 can form part of a fluid delivery pathway 662 and the tool suction nozzle 681 can form part of a fluid recovery pathway 664 as described above. Downward pressure illustrated with an arrow 697 can cause the horn tip 676T to compress the cleaning pad 696 and distribute cleaning fluid from the saturated inner layer 696B to a surface to be cleaned. Vibration of the horn 676 can cause formation of bubbles or pressure waves as described above to clean the surface. Additionally or alternatively, cleaning fluid can also be supplied via the wand 690 and tool distributor outlet 682 onto the perforated horn 676. More specifically, fluid can be delivered via the fluid delivery pathway 662 onto the horn tip 676T.

Used cleaning fluid can be removed from the surface via suction through the perforated outer layer 696A, horn tip 676T, and fluid recovery pathway 664. In one example where the ultrasonic tool 670 is positioned over a stain, the staining material can also be drawn into the cleaning pad 696 by suction. A transparent outer surface on the cleaning pad 696 can advantageously provide a user an indication that the cleaning pad 696 needs to be replaced or should not be reused. Optionally, the housing 672 can be formed of a transparent material such that a user can view the extraction of cleaning fluid through the cleaning pad 696 and horn 676.

While operation has been described with respect to a cleaning pad it will be understood that the ultrasonic tool 670 can also be utilized without a cleaning pad.

Figure 13:
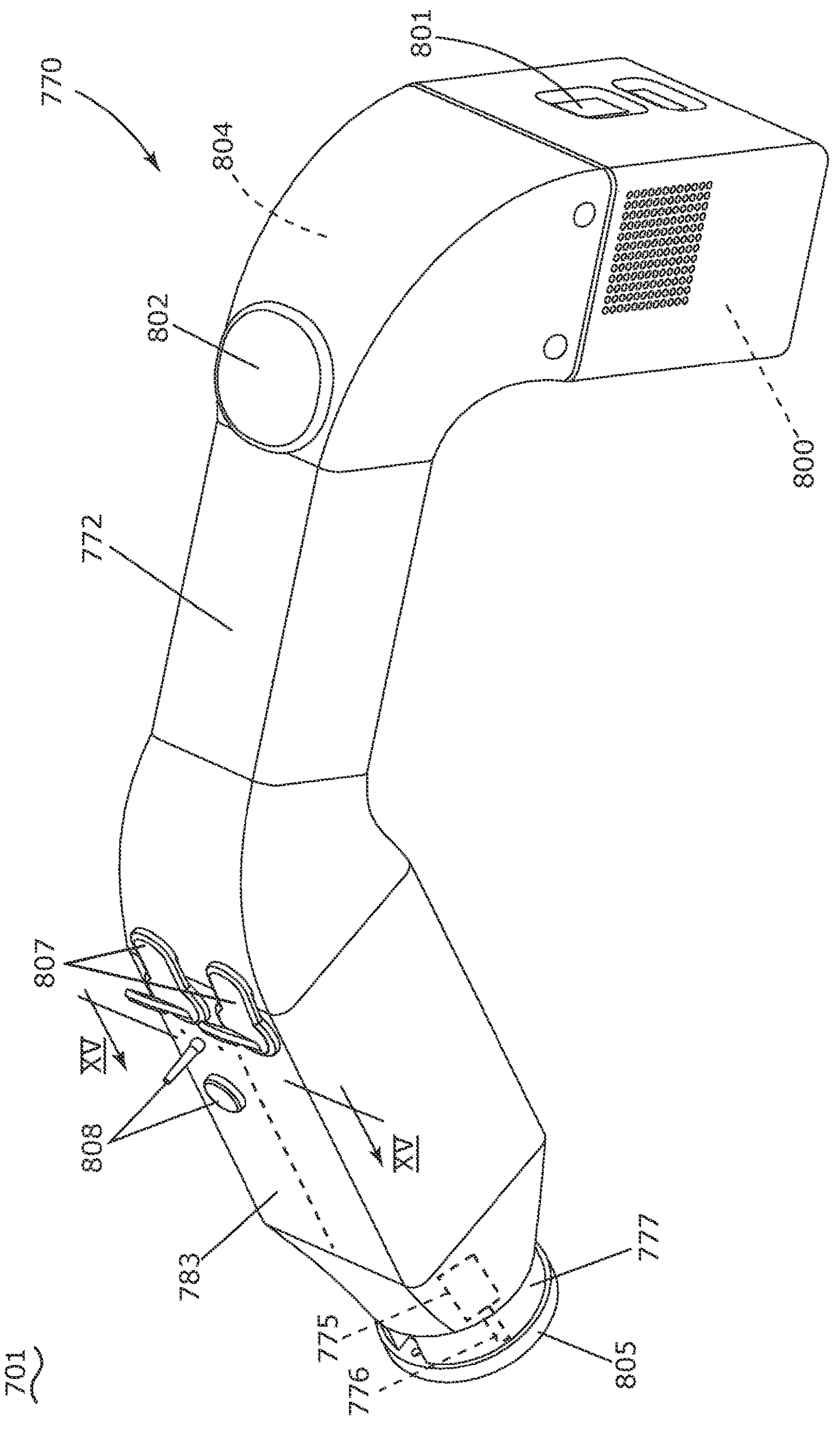
FIG. 13 is a perspective view of another system for cleaning a surface including an ultrasonic cleaning tool according to various aspects described herein.

Referring now to FIG. 13, another system 701 for cleaning a surface is illustrated. The system 701 is similar to the systems 1, 201, 301, 401, 501, 601. Therefore, like parts will be identified with like numerals further increased by 100, with it being understood that the description of the like parts of the systems 1, 201, 301, 401, 501, 601 applies to the system 701, except where noted.

The system 701 includes an ultrasonic tool 770 that is configured for use as a stand-alone device. The ultrasonic tool 770 includes a transducer 775, a horn 776, and a housing 772 that is substantially U-shaped to provide a handgrip during use. One difference is that the ultrasonic tool 770 includes a tool suction source 800 within the housing 772 instead of relying on another device. The tool suction source 800 can be similar to the suction source 18 (FIG. 1) in that it may be provided by a motor/fan assembly, etc. The tool suction source 800 can be actuated via a first actuator 801, such as a power switch or the like. In one example a separate power source 804 (FIG. 14) such as a battery can be provided within the housing to drive the tool suction source 800. Alternatively, the tool suction source 800 can include an integrated power source. In such a case, the tool suction source 800 can be rechargeable, such as via a USB cable or the like. In one non-limiting example, the tool suction source 800 can operate at 5 V and 3600 mAh, with a duration of 8 hours of operation on a single charge, with a maximum inflation pressure of 1.8 kPa and a 200 L/m flow speed.

The power source 804 (FIG. 14) can also provide power for the transducer 775. The power source 804 can include a second actuator 802 such as a push button or switch to selectively activate the transducer 775. It is also contemplated that a single actuator can be provided in place of the first and second actuators 801, 802 to operate both the tool suction source 800 and power source 804. In addition, a filter 805 can be provided at one end of the ultrasonic tool 770 adjacent the horn 776 to prevent dirt or debris larger than a predetermined size from entering the ultrasonic tool 770 while the tool suction source 800 is in operation. In a non-limiting example, the filter 805 can prevent debris larger than 500 micrometers from entering the ultrasonic tool 770.

Still another difference is that the ultrasonic tool 770 can include a tool recovery container 806 as well as a tool supply container 783 within the housing 772. In the illustrated example, the tool supply and recovery containers 783, 806 are provided side-by-side with a dividing wall or partition fluidly separating the containers 783, 806. Each of the tool supply and recovery containers 783, 806 are provided with a container cover 807 and gasket 808. In this manner, the tool supply and recovery containers 783, 806 can be filled or emptied via the container covers 807, and airflow can be provided via the gaskets 808 to prevent undesired pressure differences during filling or emptying.

Figure 14:
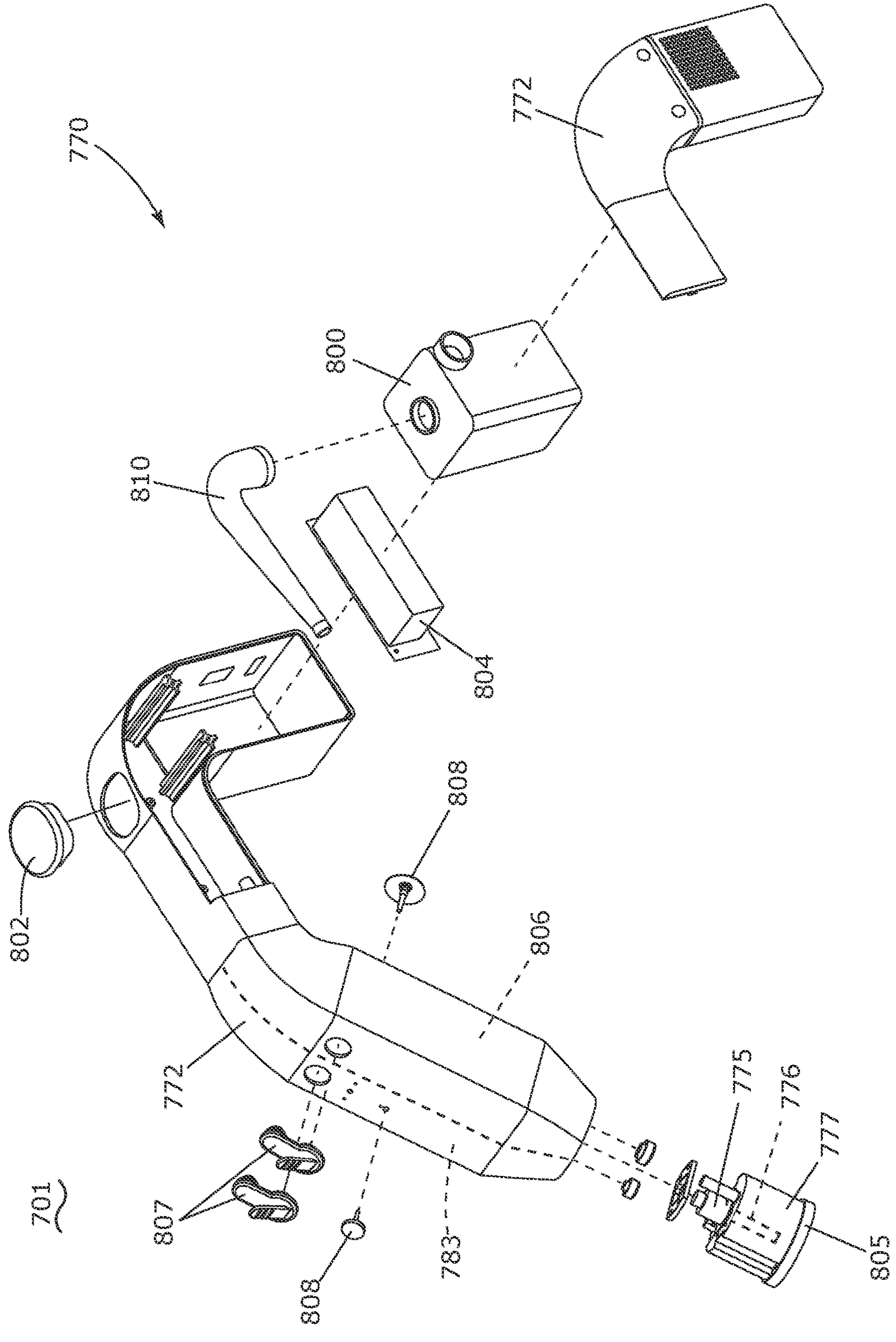
FIG. 14 is a partially-exploded view of the ultrasonic cleaning tool of FIG. 13.

FIG. 14 illustrates a partially-exploded view of the ultrasonic tool 770 where it is better illustrated that the housing 772 includes a compartment to house the tool suction source 800 at one end. An airflow conduit 810 extends from the tool suction source 800 to the tool recovery container 806. The power source 804 can be provided within the housing 772 proximate the tool suction source 800. The container covers 807 and gaskets 808 can be assembled in the corresponding tool supply and recovery containers 783, 806, and the transducer 775 and seat 777 can be assembled into the housing 772 as shown.

Figure 15:
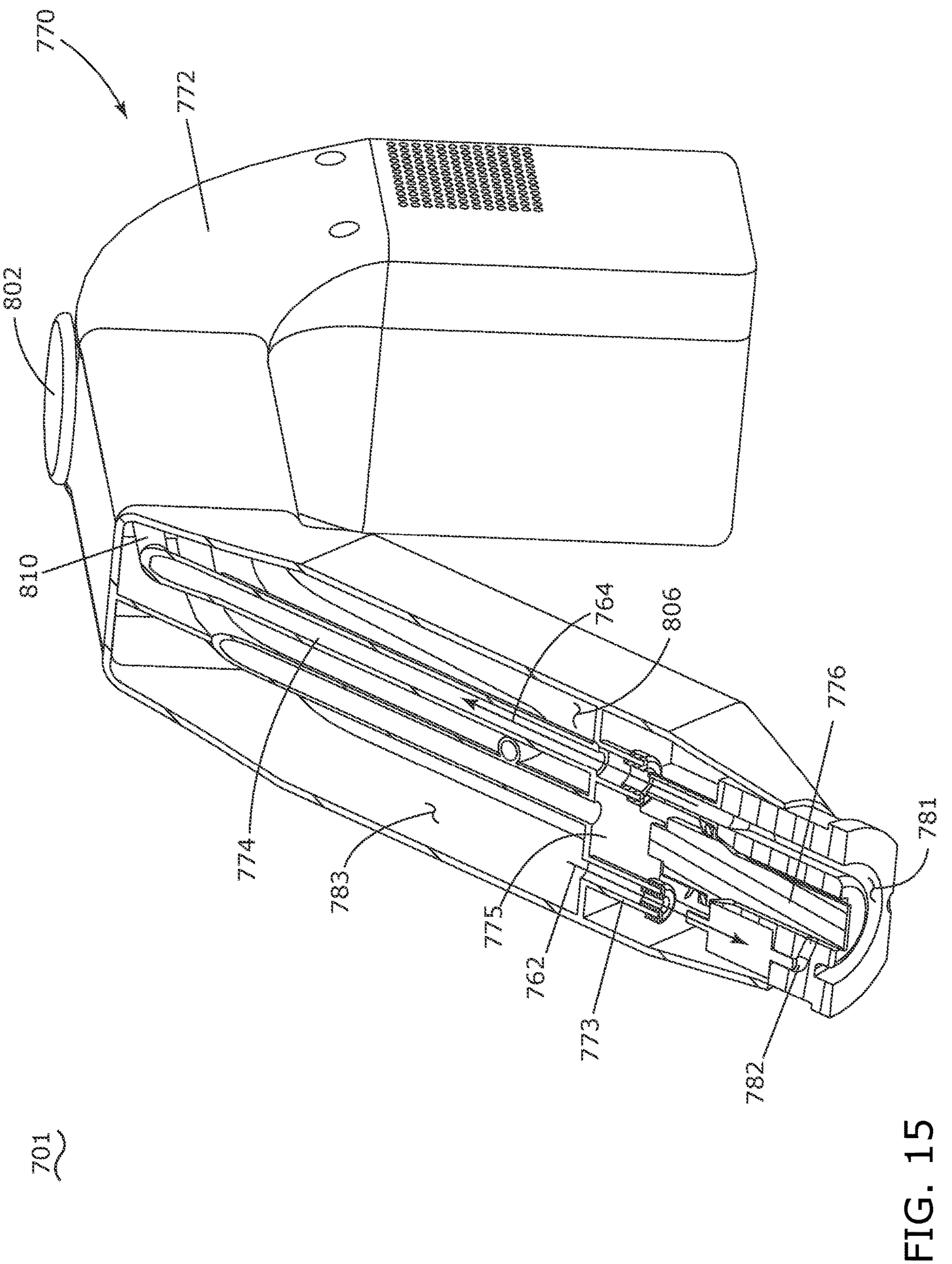
FIG. 15 is a sectional view of the ultrasonic cleaning tool of FIG. 13 along line XV-XV.

Turning to FIG. 15, a sectional view of the ultrasonic tool 770 is illustrated during operation. The ultrasonic tool 770 can further include a tool distributor outlet 782, which is slightly offset in the illustration and provides fluid onto the horn 776. The tool supply container 783 and tool delivery conduit 773 can form part of a fluid delivery pathway 762 along with the tool distributor outlet 782. In addition, the airflow conduit 810, recovery conduit 774, tool recovery container 806, and a tool suction nozzle 781 can form part of a fluid recovery pathway 764. During operation, fluid can be supplied to the tool distributor outlet 782 and a surface to be cleaned via the fluid delivery pathway 762. The horn 776 can be placed on the surface to be cleaned to inducing cavitation of cleaning fluid via vibrations created in the transducer 775. Used cleaning fluid can be recovered from the surface via the tool suction nozzle 781 and the fluid recovery pathway 764.

It is further contemplated that any of the ultrasonic tools 70, 270, 370, 470, 570, 670, 770 can be configured for use as a standalone device. For example, a removable ultrasonic unit can be housed within the housing of any of the above-described ultrasonic tools and removed for spot-cleaning in a manner similar to that described in FIG. 7. In addition, the ultrasonic unit of any of the above-described ultrasonic tools can be selectively removable for use with a variety of extraction cleaners, such as the portable extraction cleaner 210 or the upright extraction cleaner 310. Further, while illustrated as receiving a wand, it is also contemplated that any of the above-described ultrasonic tools can fluidly couple to a fluid delivery system or recovery system of an extraction cleaner through other connection devices, including a dedicated port or a hose receiver (not shown).

Aspects of the present disclosure provide for a variety of benefits, including that the use of an ultrasonic cleaning tool or accessory inducing cavitation of cleaning fluid can provide for improved cleaning of surfaces. The use of a carbonated cleaning solution can increase the rate of bubble and cavitation formation, further improving cleaning efficiency and enhanced visual feedback for cleaning efficacy compared to traditional extraction cleaners or other surface cleaning apparatuses. The pressure waves generated from imploding bubbles increase the surface area contact between the cleaning agent or chemistry and the carpet fibers, facilitating increased wetting of the surface which improves cleaning efficiency. In addition, the standalone ultrasonic tool and cleaning cloth can provide for more effective and efficient spot cleaning of a surface, for example on a surface that may be difficult to reach, or on a small area to be cleaned that may be more easily cleaned with the smaller form of the cleaning cloth.

While the invention has been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

It is intended that the following claims define the scope of the invention and that the method(s) and/or apparatus within the scope of these claims and their equivalents be covered thereby. This description of the invention should be understood to include all novel and non-obvious combinations of elements described herein, and claims may be presented in this or a later application to any novel and non-obvious combination of these elements. Any aspect of any embodiment can be combined any aspect of any of the other embodiments. Moreover, the foregoing embodiments are illustrative, and no single feature or element is essential to all possible combinations that may be claimed in this or a later application. Further aspects of the invention are provided by the subject matter of the following clauses:

1. A cleaning system, the cleaning system comprising: an extractor accessory tool, comprising a housing with a first end adapted to selectively couple an airflow connector and a second end opposite the first end, an airflow pathway located within the housing and adapted for fluid communication with a recovery container via the airflow connector, and an ultrasonic tool operably coupled to the extractor accessory tool.
2. The cleaning system of any proceeding clause wherein the extractor accessory tool further comprises a fluid delivery pathway adapted for fluid communication with a supply container.

3. The cleaning system of any proceeding clause wherein the ultrasonic tool further includes an ultrasonic tool housing with a delivery conduit defining at least a portion of the fluid delivery pathway.
4. The cleaning system of any proceeding clause wherein the housing of the extractor accessory tool comprises an ultrasonic tool receiver configured to selectively receive the ultrasonic tool.
5. The cleaning system of any proceeding clause wherein one of the ultrasonic tool receiver or the ultrasonic tool comprises a detent and the other of the ultrasonic tool receiver or the ultrasonic tool comprises a detent opening configured to receive the detent to secure the ultrasonic tool within the ultrasonic tool receiver.
6. The cleaning system of any proceeding clause wherein the ultrasonic tool operably couples the first end of the housing.
7. The cleaning system of any proceeding clause wherein the extractor accessory tool is a wand.
8. The cleaning system of any proceeding clause wherein the ultrasonic tool comprises an ultrasonic tool housing having a peripheral side wall having a mounting surface on which the wand is received.
9. The cleaning system of any proceeding clause wherein the ultrasonic tool further comprises an ultrasonic horn proximate the first end.
10. The cleaning system of any proceeding clause wherein the ultrasonic tool housing includes at least two projections at least partially surrounding the ultrasonic horn.
11. The cleaning system of any proceeding clause, further comprising an agitator operably coupled to at least one of the housing or the ultrasonic tool housing.
12. An accessory for an extraction cleaner having a fluid delivery system comprising a supply container and a recovery system comprising at least a suction source and a recovery container, the accessory comprising a housing, an airflow pathway extending through the housing between an air inlet and an air outlet, wherein the air outlet is configured for fluid communication with the recovery container, a fluid delivery pathway extending between a fluid inlet and a fluid outlet and having at least a first portion extending through the housing and wherein the fluid inlet is configured for fluid communication with the supply container, an ultrasonic horn operably coupled to the housing, and an ultrasonic transducer operably coupled to the ultrasonic horn and adapted to vibrate the horn.
13. The accessory of any proceeding clause wherein at least a portion of the housing is tubular, with the fluid delivery pathway extending parallel to the airflow pathway at the tubular portion.
14. The accessory of any proceeding clause wherein the ultrasonic horn is proximate at least one of the air inlet or the fluid outlet.
15. The accessory of any proceeding clause, further comprising an ultrasonic tool housing selectively operably countable to the housing and wherein the ultrasonic horn is mounted within the ultrasonic tool housing.
16. The accessory of any proceeding clause wherein at least a second portion of the fluid delivery pathway extends through the ultrasonic tool housing.
17. The accessory of any proceeding clause wherein the ultrasonic tool housing includes at least two projections at least partially surrounding the ultrasonic horn.
18. The accessory of any proceeding clause wherein the fluid outlet is located within the ultrasonic tool housing and is adapted to direct fluid onto the ultrasonic horn.
19. The accessory of any proceeding clause, further comprising an agitator operably coupled to at least one of the housing or the ultrasonic tool housing.
20. The accessory of any proceeding clause wherein the ultrasonic horn is received within the housing proximate both the air inlet and the fluid outlet.

What is claimed is:

1. A cleaning system comprising:

an extractor accessory tool, comprising:

a housing;

a fluid delivery pathway adapted for fluid communication with a supply container and extending through the housing;

a recovery pathway adapted for fluid communication with a recovery container and extending through the housing; and an ultrasonic tool operably coupled to the extractor accessory tool and comprising an ultrasonic horn and an ultrasonic tool housing that at least partially surrounds the ultrasonic horn, wherein the ultrasonic tool housing has a delivery conduit defining a portion of the fluid delivery pathway, a recovery conduit defining a portion the recovery pathway, and a conduit wall that fluidly separates the recovery conduit from the delivery conduit proximate the ultrasonic horn;

wherein the delivery conduit extends to a tool distribution outlet that defines a fluid outlet of the fluid delivery pathway;

wherein the supply container is adapted to contain a fluid, wherein a distal end portion of the ultrasonic horn defines an ultrasonic tip;

wherein the tool distribution outlet is disposed about the ultrasonic tip such that any of the fluid advanced from the supply container along the fluid delivery pathway and dispensed through the tool distribution outlet is directed about the ultrasonic tip;

wherein the ultrasonic tool further comprises an ultrasonic transducer that is operably coupled to the ultrasonic horn to vibrate the ultrasonic horn and the ultrasonic tip thereby agitating any of the fluid disposed about the ultrasonic tip to form an agitated fluid with bubbles formed therein to enhance cleaning of an adjacent surface in contact with the agitated fluid; and wherein the ultrasonic tip extends further toward the adjacent surface than does the conduit wall, wherein the recovery conduit extends to a tool suction nozzle that defines an inlet to the recovery pathway with the tool suction nozzle positioned outward of the tool distribution outlet, and the conduit wall separates the tool suction nozzle from the ultrasonic horn and the tool distribution outlet.

2. The cleaning system of claim 1, wherein the conduit wall at least partially surrounds the ultrasonic horn and the tool distribution outlet.

3. The cleaning system of claim 2, wherein the conduit wall is an annular conduit wall that surrounds the tool distribution outlet, and wherein the tool distribution outlet surrounds the ultrasonic horn.

4. The cleaning system of claim 3, wherein the tool suction nozzle surrounds the conduit wall.

5. The cleaning system of claim 1, wherein the ultrasonic tip is disposed at about a center of the tool distribution outlet.

6. The cleaning system of claim 1, wherein the tool suction nozzle is adapted for fluid communication with the adjacent surface to remove the agitated fluid from the adjacent surface for fluid communication to the recovery container.

7. The cleaning system of claim 1, wherein the extractor accessory tool is a wand, and wherein the ultrasonic tool housing has a peripheral side wall having a mounting surface on which the wand is received.

8. The cleaning system of claim 1, wherein the ultrasonic tool housing comprises an internal divider that is spaced apart from the conduit wall and that fluidly separates the delivery conduit and the recovery conduit within the ultrasonic tool housing.

9. The cleaning system of claim 1, wherein the ultrasonic tool housing is directly coupled to the housing.

10. An accessory for an extraction cleaner having a fluid delivery system comprising a supply container and a recovery system comprising at least a suction source and a recovery container, the accessory comprising:

a housing;

a fluid delivery pathway extending through the housing and between a fluid inlet and a fluid outlet, wherein the fluid inlet is adapted for fluid communication with the supply container;

a recovery pathway extending through the housing and between an inlet and an outlet, wherein the outlet is adapted for fluid communication with the recovery container; and an ultrasonic tool comprising:

an ultrasonic tool housing coupled to the housing, wherein the ultrasonic tool housing has a delivery conduit that defines a portion of the fluid delivery pathway and extends to a tool distribution outlet that defines the fluid outlet of the fluid delivery pathway, a recovery conduit that defines a portion the recovery pathway and extends to a tool suction nozzle that defines the inlet of the recovery pathway, and a conduit wall that fluidly separates the tool suction nozzle from the tool distribution outlet with the tool suction nozzle being positioned outward of the tool distribution outlet;

an ultrasonic horn operably coupled to the ultrasonic tool housing; and an ultrasonic transducer operably coupled to the ultrasonic horn and adapted to vibrate the ultrasonic horn;

wherein a distal end portion of the ultrasonic horn defines an ultrasonic tip; and wherein the tool distribution outlet is positioned within the ultrasonic tool housing and outward of an outer surface of the ultrasonic tip to direct fluid onto the outer surface of the ultrasonic tip.

11. The accessory of claim 10, wherein the conduit wall fluidly separates the tool suction nozzle from the ultrasonic horn and the tool distribution outlet.

12. The accessory of claim 10, wherein the conduit wall surrounds the ultrasonic horn and the tool distribution outlet.

13. The accessory of claim 12, wherein the tool suction nozzle surrounds the conduit wall.

14. The accessory of claim 13, wherein the ultrasonic tip is disposed at about a center of the tool distribution outlet.

15. The accessory of claim 10, further comprising an agitator operably coupled to at least one of the housing or the ultrasonic tool housing.

16. The accessory of claim 10, wherein at least a portion of the housing is tubular, with the fluid delivery pathway extending parallel to the recovery pathway along a length of the tubular portion.

17. The cleaning system of claim 1, wherein the ultrasonic tip forms a flattened disk.

18. The cleaning system of claim 17, wherein perforations extend through the flattened disk and form part of the recovery pathway.

19. The accessory of claim 10, wherein the ultrasonic tip forms a flattened disk.

* * * * *